(12) United States Patent
Nakamura et al.

(10) Patent No.: US 7,120,505 B2
(45) Date of Patent: Oct. 10, 2006

(54) SAFETY NETWORK SYSTEM, SAFETY SLAVE, AND SAFETY CONTROLLER

(75) Inventors: Toshiyuki Nakamura, Kyoto (JP); Yasuo Muneta, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/481,516

(22) PCT Filed: Jun. 21, 2002

(86) PCT No.: PCT/JP02/06241

§ 371 (c)(1),
(2), (4) Date: Jun. 9, 2004

(87) PCT Pub. No.: WO03/001306

PCT Pub. Date: Jan. 3, 2003

(65) Prior Publication Data

US 2004/0215354 A1    Oct. 28, 2004

(30) Foreign Application Priority Data

Jun. 22, 2001    (JP) .............................. 2001-190417

(51) Int. Cl.
G05B 19/18    (2006.01)
G05B 9/02    (2006.01)
G05B 11/01    (2006.01)

(52) U.S. Cl. .................... 700/3; 700/2; 700/5; 700/21; 700/79; 700/80; 709/208; 709/209; 709/210; 709/211; 710/110

(58) Field of Classification Search ................ 700/2, 700/3, 5, 21, 79, 80, 81, 82; 709/208, 209, 709/210, 211; 710/110

See application file for complete search history.

(56) References Cited

U.S. PATENT DOCUMENTS 4,625,308 A * 11/1986 Kim et al. .................. 370/321

(Continued)

FOREIGN PATENT DOCUMENTS

DE    195 16 938 C1    12/1996

(Continued)

OTHER PUBLICATIONS

R. Valle-Alarcon et al., "A Flexible Protocol Communications Approach For A Supervisory System" *ICCST*, Zurich, Switzerland, Oct. 3, 1989, pp. 267-269.

(Continued)

*Primary Examiner*—Ramesh Patel
(74) *Attorney, Agent, or Firm*—Foley & Lardner LLP

(57) ABSTRACT

A safety network system is constructed by connecting a safety PLC to a safety slave through a safety network. The safety slave obtains safety input informations from a plurality of safety devices connected thereto and transmits information based on the plurality of safety input informations in response to a request from the safety PLC. At this time, the safety slave determines whether or not a safety condition is satisfied based on the plurality of safety input informations, includes two notification modes, that is, a result notification mode in which a result of determination of safety determined by the above determination is transmitted and a detailed information mode in which the plurality of safety input informations are transmitted as they are as aggregated data, and returns a safety response in any of the modes according to a command from the safety PLC. In the result notification mode, the response can be returned at a high speed because an amount of data is small, and, in the detailed information mode, detailed information can be secured.

11 Claims, 18 Drawing Sheets

U.S. PATENT DOCUMENTS

| | | | |
|---|---|---|---|
| 4,715,031 A * | 12/1987 | Crawford et al. | 370/462 |
| 4,750,171 A * | 6/1988 | Kedar et al. | 370/445 |
| 5,218,680 A * | 6/1993 | Farrell et al. | 709/215 |
| 5,400,018 A | 3/1995 | Scholl et al. | |
| 5,732,094 A * | 3/1998 | Petersen et al. | 714/805 |
| 5,850,338 A | 12/1998 | Fujishima | |
| 5,907,689 A * | 5/1999 | Tavallaei et al. | 710/110 |
| H1882 H * | 10/2000 | Asthana et al. | 370/503 |
| 6,389,480 B1 * | 5/2002 | Kotzur et al. | 709/249 |
| 6,535,112 B1 | 3/2003 | Rothschink | |
| 6,574,234 B1 * | 6/2003 | Myer et al. | 370/462 |
| 6,640,268 B1 | 10/2003 | Kumar | |
| 2002/0082060 A1 | 6/2002 | Kang et al. | |
| 2003/0037170 A1 * | 2/2003 | Zeller et al. | 709/253 |
| 2003/0148760 A1 | 8/2003 | Takayangi | |
| 2004/0018129 A1 | 1/2004 | Muneta et al. | |
| 2004/0125821 A1 * | 7/2004 | Kuhl | 370/503 |

FOREIGN PATENT DOCUMENTS

| | | |
|---|---|---|
| DE | 196 29 868 A1 | 2/1998 |
| EP | 0905594 A1 | 3/1999 |
| GB | 2267984 A | 12/1993 |
| GB | 2307068 A | 5/1997 |
| JP | 60-062482 A | 4/1985 |
| JP | 03-116395 A | 5/1991 |
| JP | 04-045697 A | 2/1992 |
| JP | 05-37980 A | 2/1993 |
| JP | 6-324719 A | 11/1994 |
| JP | 7-282090 A | 10/1995 |
| JP | 08-211792 A | 8/1996 |
| JP | 11-24744 A | 1/1999 |
| JP | 2000-259215 A | 9/2000 |
| JP | 2000-269996 A | 9/2000 |
| JP | 2001-83002 A | 3/2001 |
| JP | 2001-084014 A | 3/2001 |
| JP | 2002-71519 A | 3/2002 |
| JP | 2002-73121 A | 3/2002 |
| WO | WO 02/098065 A1 | 12/2002 |

OTHER PUBLICATIONS

S. Poledna et al., "TTP-Kommunikationsarchitektur für "x-by-wire"-Systeme", *Automotive Electronics,* 2000, pp. 100-104.

W. Kriesel et al., "ASI im Überblick", *Aktuator Sensor Interface Fuer Die Automation,* 1994, pp. 11-60.

* cited by examiner

Fig. 7

(a) <RESULT NOTIFICATION MODE>

| START CODE | SELF-NODE ADDRESS | SAFETY DETERMINATION RESULT CODE | CHECK CODE | STOP CODE |
|---|---|---|---|---|

(b) <DETAILED INFORMATION MODE>

| START CODE | SELF-NODE ADDRESS | SAFETY DETERMINATION RESULT CODE | CAUSE OF DANGER CODE | CHECK CODE | STOP CODE |
|---|---|---|---|---|---|

SAFETY NETWORK SYSTEM, SAFETY SLAVE, AND SAFETY CONTROLLER

This application is a National Stage application of PCT/JP02/06241, filed Jun. 21, 2002, which claims priority from Japanese patent application 2001-190417, filed Jun. 22, 2001. The entire contents of each of the aforementioned applications are incorporated herein by reference.

TECHNICAL FIELD

The present invention relates to a safety network system, a safety slave, and a safety controller.

BACKGROUND ART

A programmable controller (hereinafter, referred to as "PLC") used in factory automation (hereinafter, referred to as "FA") executes control in such a manner that it is supplied with ON/OFF information from input devices such as switches, sensors, and the like, executes a logical operation using a sequence program (also referred to as user's program) written in a ladder language and the like, and outputs the signals of ON/OFF information to output devices such as relays, valves, actuators, and the like according to a result of the arithmetic operation.

Incidentally, as a connection mode between the PLC and the input and output devices, the input and output devices may be directly connected to the PLC or may be connected to the PLC through a network. When a network system, in which the input and output devices are connected to the PLC through the network, is constructed, the ON/OFF information is transmitted and received through the network. At this time, the information is ordinarily transmitted using a master/slave system in which the PLC acts as a master and the input and output devices act as slaves.

In contrast, recently, a failsafe (safety) system is being introduced also in the control executed by the PLC. That is, a safety function is built in not only the PLC and the respective devices but also in the network. The safety function is a function for executing an output after a safe state is confirmed. In a safety system, failsafe function is executed when the network system is placed in a dangerous state by that an emergency stop switch is depressed, sensors such as a light curtain and the like detect an incoming person (a part of a body), and the like so that the safety system is set to a safe side and the operation thereof is stopped. In other words, the safety system is a system that issues an output only when the safe state is confirmed by the safety function and operates a machine. Therefore, when the safe state cannot be confirmed, the machine is stopped.

When a slave receives a request from, for example, the PLC (master), the slave can return its state as a response, thereby the PLC can obtain the state of the slave connected to the network.

Incidentally, when a dangerous state occurs in the safety network system, it is preferable to switch the system to a safe side as soon as possible and to stop the system. However, an increase in the number of safety devices connected to the safety network inevitably increases a communication cycle time because safety informations as many as the safety devices are transmitted in one communication cycle. Accordingly, even if safety information (danger information) can be transmitted at the beginning of a communication cycle, there passes a period of time corresponding to a communication cycle from previous transmission to present transmission. Thus, the failsafe function cannot be executed by promptly notifying the occurrence of the dangerous state. When the safety information (danger information) is transmitted at the end of the communication cycle, the execution of the failsafe function is more delayed.

Further, although the safety information (danger information) can be transmitted when the safety devices and the safety slaves operate normally, there is a case that the safety information cannot be transmitted to the safety PLC because an apparatus itself fails or the network is in an abnormal state. In this case, the failsafe function must be also executed determining that the abnormal state occurs.

In this case, when there is a safety slave (safety device) that sends no response even if a preset receiving time has passed after a request is transmitted thereto by, for example, a simultaneous transmissive communication (timeout), it is possible to determine that the safety slave is abnormal. Accordingly, a receiving time from which the timeout occurs must be set at least longer than a communication cycle time in a normal state, and thus when the communication cycle time increases as described above, a period of time necessary to determine whether or not the network is abnormal also increases, which prevents the prompt execution of a processing when the abnormal state occurs.

Note that when a plurality of safety devices are connected to one safety slave (terminal), since the safety slave collects safety informations from the plurality of safety devices and transmits the safety informations of all the safety devices connected thereto at a time, from the problem described above arises.

An object of the present invention is to provide a safety network system, a safety slave, and a safety controller that can promptly transmit whether or not safety devices (safety device) are safe to a master (safety controller) and other devices, promptly execute the failsafe function when an abnormal (dangerous) state occurs, and further confirm the detailed information of an overall system and promptly specify a malfunction when a dangerous portion is specified or the system is debagged.

DISCLOSURE OF THE INVENTION

A safety slave according to the present invention, which can be connected to a safety network and transmits the information based on the plurality of safety input informations managed by the safety slave in response to a request from a safety controller sent through the safety network, comprises a safety determination means for determining whether or not a safety condition is satisfied based on the plurality of safety input informations and a means for transmitting a result of determination of safety determined by the safety determination means as the information.

The safety input informations are informations indicating a state of safety devices, that is, informations for determining whether or not the safety devices are "safe" or "not safe (abnormal, danger)", and may be also called safety informations. Further, information as to whether or not the safety slave itself is in a safe state may be also included in the safety informations. It is needless to say that information other than the above informations may be included in the safety input informations. In particular, as described later, when the safety input informations are sent as they are, it is preferable to add additional information other than the safety input informations because the devices such as the safety controller and the like that receive the safety input informations can understand a state in detail.

The safety determination means is realized by an MPU 23 in an embodiment. Further, in the embodiment, safety is determined such that when all the safety input informations indicate "safe", the result of determination of safety is made "safe", whereas when there exists even one safety input information that indicates not safe, the result of determination of safety is made "not safe (abnormal, dangerous)". However, other conditions may be set to determine safety.

According to the present invention, when safety input informations are received from a plurality devices (safety devices, other safety slaves, and the like) connected to the safety slave, a result of determination of safety (safe or not safe, and the like), which is determined based on the plurality of safety input informations, is sent to the safety controller in place of sending all the safety input informations they are, which can reduce an amount of data returned to the safety controller. Accordingly, a period of time necessary to one communication cycle can be reduced, and thus when an abnormal state (dangerous state) occurs, it can be promptly notified to the safety controller.

Further, the safety determination means can easily make determination by executing, for example, a logic operation (AND). Further, the result of determination of safety may be regarded as a result of the logic operation of a plurality of safety input informations or as a result of compression processing of predetermined data. In short, what is important is that the devices such as the safety controller and the like, which have received the result of determination of safety, can determine whether or not a system is safe while reducing an amount of data.

A safety slave preferably comprises a function for notifying the plurality of safety input informations as they are as the information composed of aggregated data. In this embodiment, The function corresponds to the transmission of information in a "detailed information mode". It is needless to say that although this function may not be provided, the provision of the function makes it possible to recognize the individual states of the respective safety devices and the like on the safety controller side, which will be useful to specify dangerous portions and to variously analyze the contents of malfunctions.

Further, when the safety input informations are composed of the aggregated data, it is possible to notify not only all the safety input informations as they are but also to use the aggregated data obtained by compressing a part of the informations as the information to be notified. That is, when it is assumed that eight safety input informations are received, safety is determined as to a part of the informations (four informations) similarly to the above case, wherein it is determined that the system is safe when all the four informations are safe, and it is determined that the system is not safe when any one of the informations is not safe. Then, the data obtained by aggregating a result of the above determination and the remaining four safety input informations can be arranged as the aggregated data. When the safety input informations are partly sent as they are as described above, the number of the informations need not be half the total number of the informations as in the example, and any arbitrary number of the informations may be used.

Further, the safety slave may comprise a function for detecting the cause of danger of at least one of the safety slave itself and the devices managed thereby as well as transmitting the cause of danger by adding it to the information. The addition of the cause of danger enables the execution of a more detailed analysis and the like. Note that the above information, which is sent together with the cause of danger, may be the result of determination of safety described above or may be the aggregated data composed of the plurality of safety input informations. Informations other than the above may be of course sent together with the cause of the danger.

Further, the safety slave of the present invention is not limited to an ordinary slave to which the safety devices are connected and may be a safety gateway to which a different type of a field bus is connected. In this case, the safety input informations are safety input informations from a plurality of other safety slaves connected to the safety gateway. Accordingly, the result of determination of safety is obtained by determining whether or not the safety condition is satisfied based on the respective safety input informations obtained from the plurality of other safety slaves.

In contrast, as the more detailed information, the plurality of safety input informations having been obtained can be notified as they are as the aggregated data. Further, as another mode of the detailed information, the plurality of safety input informations having been obtained can be transmitted by time-sharing in each predetermined unit. A unit of node can be used as the predetermined unit as shown in, for example, the embodiment (FIG. 9(c)). Then, it is possible to change a type (mode) of information to be notified in each unit by transmitting the information in the predetermined unit as described above. With the above method, useful information can be received effectively and promptly by receiving the informations of necessary units in the detailed information mode and receiving the result of determination of safety from the units other than the necessary units.

Further, when it is possible for the safety slave to make transmission at least in a result notification mode, in which the result of determination of safety is transmitted, and in a detailed information mode, which is different from the result notification mode and in which more detailed information is transmitted, the transmission modes may be selectively switched based on a communication command from the safety controller. Otherwise, the safety slave may comprise a setting switch means for switching the transmission modes, and the transmission modes may be switched in response to an indication from the selection switch means.

A safety network system according to the present invention is constructed by connecting a safety controller to the safety slave composed of the various types of the arrangements described above through a safety network. Then, the information output from the safety slave is transmitted to the safety controller through the safety network.

Further, the safety controller according to the present invention is a safety controller which is connected to the safety network and can construct a safety network system together with the safety slaves. The safety controller comprises a state memory unit for storing and holding whether or not the state of the safety network system is in a safe state, wherein when a present state stored in the state memory unit is safe, the safety controller requests the safety slave to transmit the result of determination of safety, and when the present state stored in the state memory unit is not safe, the safety controller requests the safety slave to transmit detailed information which is in more detail than the result of determination of safety. In the embodiment, the state storing unit corresponds to a state storing unit that stores a safety flag. Note that the safety controller for constructing the safety network system according to the present invention need not be provided with the state storing unit and the function for issuing a request based on the present state stored in the state storing unit as described above.

Further, another safety slave is a safety slave which can be connected to a safety network and transmits the information based on the plurality of safety input informations managed by the safety slave to other nodes connected to the safety network. The safety slave comprises a safety determination means for determining whether or not a safety condition is satisfied based on the plurality of safety input informations and a means for transmitting a result of determination of safety determined by the safety determination means as the information.

In this case, timing at which the safety slave transmits the safety information may be determined based on any of an internal trigger and an external trigger. Further, also in the safety slave that makes transmission to the other node, the safety slave is preferably provided with a function for notifying the plurality of safety input informations as they are as the above information composed of aggregated data. This function corresponds to the transmission in the "detailed information mode" in the embodiment. It is needless to say that although this function may not be provided, the provision of the function makes it possible to recognize the individual states of the respective safety devices and the like on the safety controller side, which is useful to specify dangerous portions and to variously analyze the contents of malfunctions.

Further, the safety slave may comprise a function for detecting the cause of danger of at least one of the safety slave itself and the devices managed thereby as well as transmitting the cause of danger by adding it to the information. A more detailed analysis and the like can be executed by the adding the cause of danger. Note that the information sent together with the cause of danger may be the result of determination of safety described above or the aggregated data composed of the plurality of safety input informations. Informations other than the above information may be of course sent together with the cause of the danger.

Further, the safety slave of the present invention is not limited to an ordinary slave to which the safety devices are connected and may be a safety gateway to which a different type of a field bus is connected. In this case, the safety input informations are the safety input informations from a plurality of other safety slaves connected to the safety gateway. Accordingly, the result of determination of safety is determined by determining whether or not the safety condition is satisfied based on the respective safety input informations obtained from the plurality of other safety slaves.

In contrast, as the more detailed information, a plurality of obtained safety input informations can be notified as they are as aggregated data. Further, another mode of the detailed information is to enable the plurality of obtained safety input informations to be transmitted in each predetermined unit by time-sharing.

Further, when the safety slave can make transmission at least in the result notification mode, in which the result of determination of safety is transmitted, and in the detailed information mode, which is different from the result notification mode and in which the more detailed information is transmitted, the transmission modes may be selectively switched based on a communication command from the other node. Otherwise, the safety slave may comprise a setting switch means for switching the transmission modes, and the transmission modes may be switched in response to an indication from the selection switch means.

Then, the safety network using the above safety slave may be arranged such that the information output from the safety slave is transmitted to the other node through the safety network.

BRIEF DESCRIPTION OF THE DRAWINGS

FIGS. 7(a) and 7(b) show views of examples of a specific data structure of a transmission frame acting as a main portion of a second embodiment of the present invention.

FIGS. 9(a), 9(b), 9 (c) show views of examples of timing of transmission of a frame between a master and a slave.

FIGS. 12(a) and 12 (b) show views of examples of timing of transmission of a frame between an IN slave and an OUT slave.

BEST MODE FOR CARRYING OUT THE INVENTION

The present invention will be explained in more detail with reference to the accompanying drawings.

Figure 1:
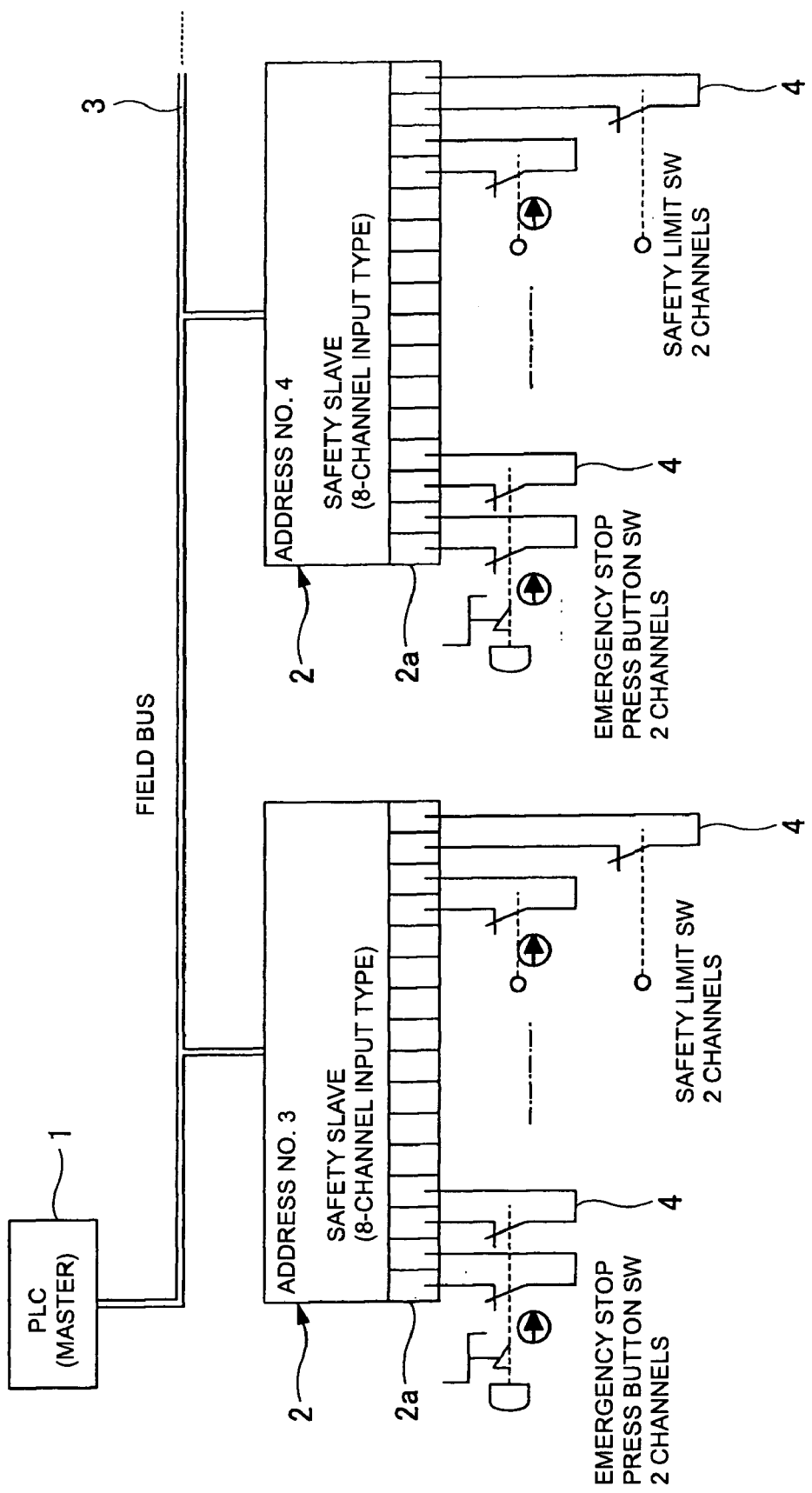
FIG. 1 shows a view of a first embodiment of a safety network system according to the present invention.

FIG. 1 shows an example of a safety network system to which the present invention is applied. As shown in the figure, a safety PLC 1 (master) is connected to a plurality of safety slaves 2 through a safety network (field bus) 3. Informations are transmitted and received between the safety PLC 1 and the safety slaves 2 using a master/slave system. Further, connected to each of the safety slaves 2 are safety devices 4 such as various types of input devices, output devices, and the like, in addition to safety door switches, safety limit switches, emergency stop switches, and the like. Note that the safety PLC 1 is arranged by coupling a plurality of units, for example, a CPU unit, a master unit (communication unit), an I/O unit, and the like. In this case, a master unit is connected to the safety network 3.

A safety function (failsafe function) is built in all of the various types of the devices constituting the safety network system. The safety function is a function for executing an output (control) after a safe state is confirmed thereby. Then, when a dangerous state occurs, the failsafe function is executed, thereby the operation of the system is stopped after it is switched to a safe side. That is, in the safety system, the failsafe function is executed when the network system is placed in the dangerous state by that an emergency stop switch is depressed, sensors such as a light curtain and the like detect an incoming person (a part of a body), and the like so that the system is switched to the safe side and the operation thereof is stopped. In other words, the safety system is a system for executing an output only when it is confirmed that the system is in the safe state by the safety function and operating machines. Therefore, when the safe state cannot be confirmed, the machines are stopped.

Figure 2:
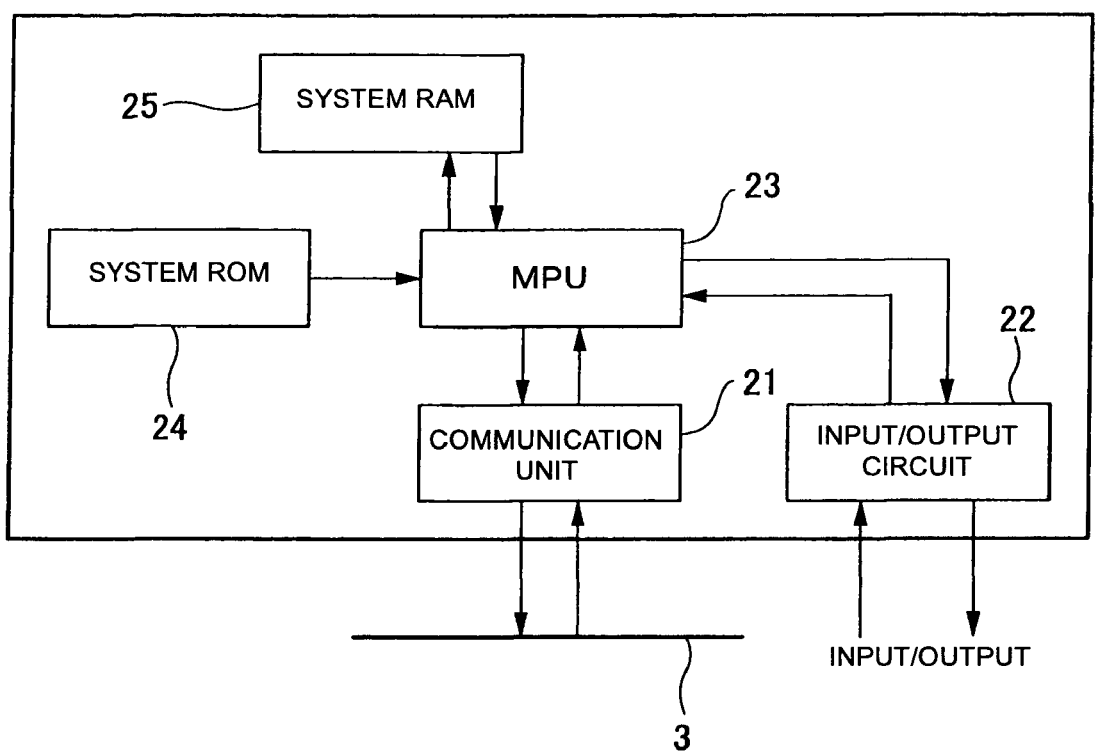
FIG. 2 shows a block diagram of a safety slave in the first embodiment according to the present invention.

Next, the transmission and reception of information, which is an important factor of the present invention, of the safety function described above will be explained. Each of the safety slaves 2 includes a plurality of terminal tables 2a, and the various types of the safety devices 4 are connected to the terminal tables 2a. In contrast, the internal structure of the safety slave 2 is arranged as shown in FIG. 2. As shown in the figure, the safety slave 2 includes a communication unit 21, which is connected to the safety network 3 and transmits and receives data to and from the safety PLC 1 (master), an input/output circuit 22 for transmitting and receiving data to and from the safety devices 4 connected to the safety slave 2, and an MPU 23 for reading out a program stored in a system ROM 24 and executing predetermined processings. The MPU 23 executes processing for returning informations (safety information and the like), which are obtained from the safety devices 4 through the input/output circuit 22, to the safety PLC 1 (master) through the communication unit 21 and the safety network 3 in response to a request addressed thereto and received thereby through the communication unit 21.

The MPU 23 creates a safety response (transmission frame including safety information) based on a request from the safety PLC 1 (master) and returns it to the safety PLC 1 (master) At this time, there are two types of safety responses as the created safety response (transmission frame), that is, a safety response having a small amount of data in a result notification mode and a safety response having a large amount of data in a detailed information mode. In the result notification mode, the safety slave 2 collects the safety input informations from all the safety devices 4 connected thereto, determines whether or not all the safety devices 4 are safe, and stores a result of determination in a data unit. That is, when the safety input informations of all the safety devices 4 indicate "safe", the result of determination is made "safe", whereas when there exists even one safety device 4 whose safety input information indicates "abnormal (dangerous)", the result of determination is made "dangerous".

As described above, this embodiment includes the two types of the modes having a different content, and a safety response having a different content is created from each of the modes. Then, when a safety request is issued, a safety response is not created in each of the modes (although it may be created in each of them) but is created in any one of the modes and transmitted.

Although the result of determination of safety is set in two bits (00: dangerous, 11: safe) in this embodiment, it may be also expressed by one bit. A specific transmission frame used in the result notification mode is as shown in, for example, in FIG. 3(a).

Further, in the above example, all the plurality of channels managed by the safety slave 2 are handled as one unit, and when all the channels are safe, the channels are determined safe. However, the present invention is not limited thereto, and the plurality of channels may be separated into units and it may be determined whether or not the channels are safe in each of the separated units. That is, when there is an input of, for example, 8 channels, the 8 channels are managed by being separated into first to fourth channels and into fifth to eighth channels, and a case that any of the first to fourth channels is dangerous and a case that any of the fifth to eighth channels is dangerous are separately transmitted.

With the above arrangement, the range of equipment that is stopped by applying the failsafe function can be reduced. As a specific example, it is assumed that the equipment is divided into apparatuses A to C, and a switch, a sensor, and the like relating to the dangerous state of the apparatus A are connected to the first to fourth channels of the safety slave. In contrast, the two emergency stop switches of the apparatus B are connected to the fifth and sixth channels of the safety slave, and the emergency stop switch of the apparatus C is connected to the seventh channel thereof (an eight channel is not used). At this time, if the switch of the seventh channel is turned ON, only the apparatus C is stopped and the other apparatuses A and B can be operated as they are. Accordingly, productivity is not deteriorated as compared with a case that all the apparatuses (entire equipment) are stopped by the dangerous input of the seventh channel. Even if the channels are divided into the plurality of units, it is more effective than the case that the safety informations of all the safety devices 4 are transmitted.

In contrast, in the detailed information mode, the safety input informations of the plurality of channels obtained from the safety devices 4 connected to the safety slave 2 are notified as they are as aggregated data similarly to a known technology. A specific transmission frame used in the specific information mode is as shown in, for example, in FIG. 3(b). When it is assumed that the safety slave 2 is of an eight-channel input type, safety informations for the eight channels are stored in the data of the transmission frame.

Figure 3:
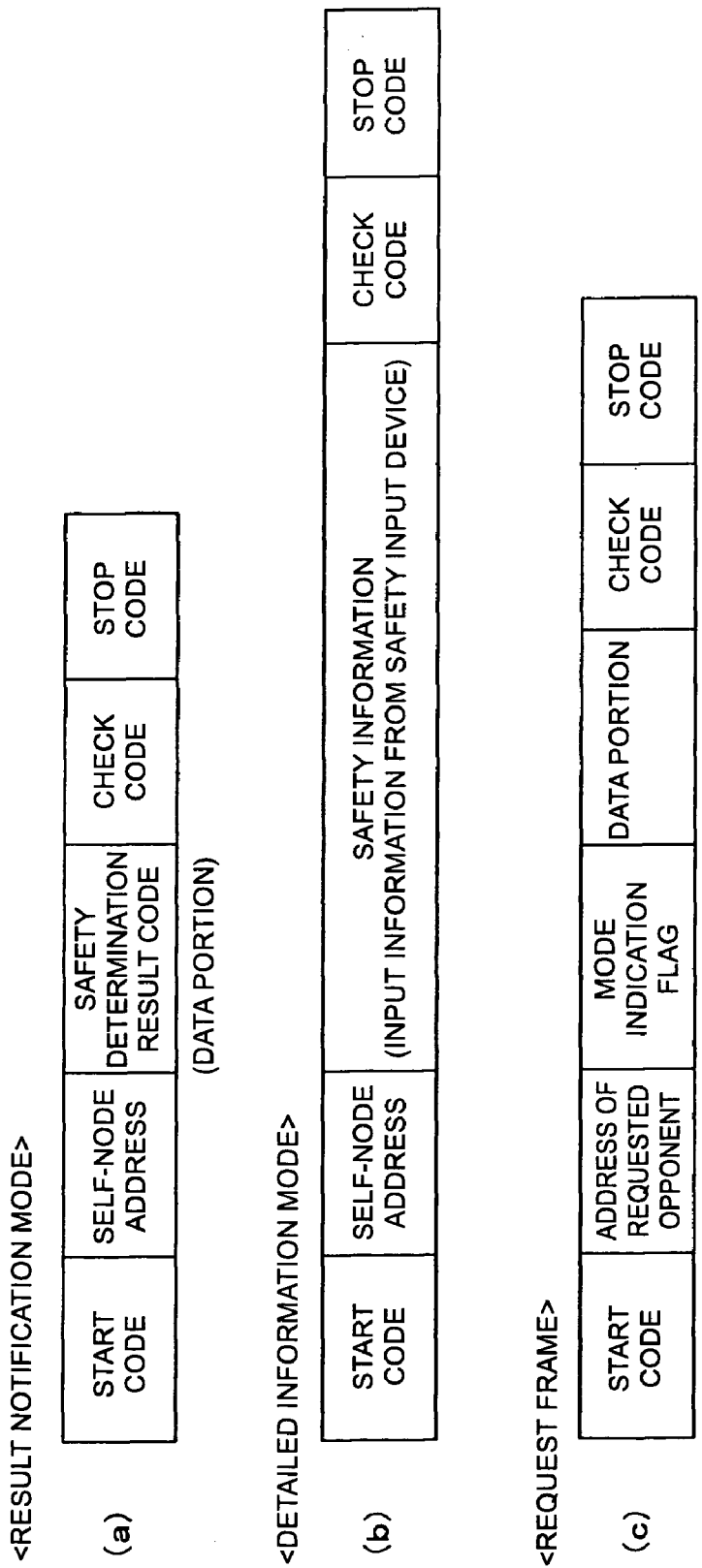
FIGS. 3(a), 3(b), 3(c) show views of examples of a specific data structure of a transmission frame.

Then, the request from the safety PLC 1, which determines transmission is to be executed in any of the modes, is arranged as a transmission frame shown in, for example, FIG. 3(c). That is, the transmission frame includes an address to which the request is issued (address of safety frame, all the safety slaves can be designated by simultaneous transmissive communication), a mode indication flag (01: result mode, 11: detailed mode), and the like.

More specifically, when even one of the respective safety devices 4 constituting the network system is in the "dangerous state" while the system is in operation, the safety PLC 1 stops the system. In contrast, when all the safety devices 4 are in the safe state, the system is operated as it is. Accordingly, when the failsafe function is executed, it is important whether or not there exists a safety device which detects the data dangerous state, and it is not very important to specify the safety device that detects the dangerous state and to find a cause of the detected dangerous state.

On the contrary, when an emergency stop button is depressed because a dangerous state and the like occur, when maintenance is executed, and when the equipment is started up, the portion where a malfunction occurs and the content of it must be specified. Thus, there is a request for obtaining safety informations.

To cope with the above request, in this embodiment, a result notification request command is ordinarily issued from the safety PLC 1 as shown in FIG. 4(a), and the respective safety slaves 2, which have received the command, return a result of determination of safety (2 bits)

obtained thereby based on their determination to the safety PLC 1 as a safety response. With the above operation, a cycle time of communication executed once can be reduced, and safety information, in particular, safety information indicating a dangerous state can be notified promptly.

Figure 4:
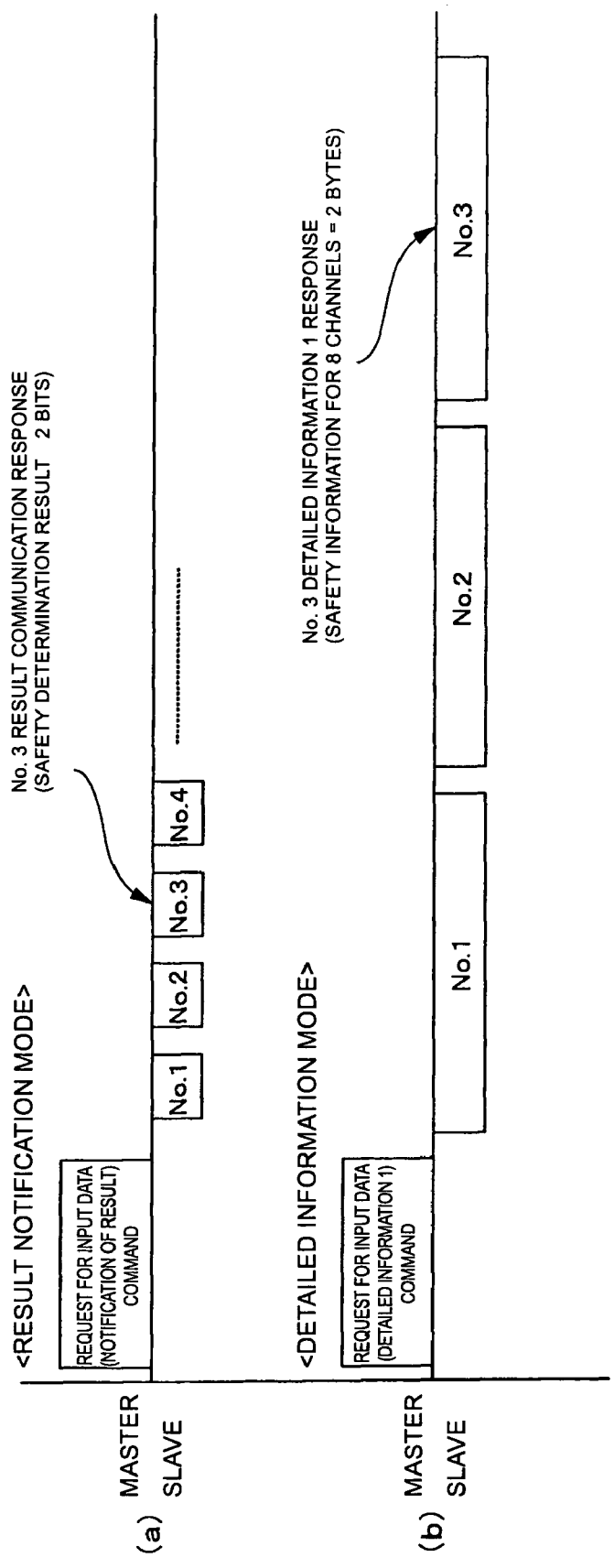
FIGS. 4(a) and 4(b) show views of examples of timing of transmission of a frame between a master and a slave.

Then, as shown in FIG. 4(*b*), when the safety PLC 1 issues a detailed information request command at a predetermined timing after a dangerous state and the like occurs and the system is switched to the safe side, the respective safety slaves 2, which have received the command, return the safety information from the safety devices connected thereto to the safety PLC 1 as a detailed information in the form of a safety response. With the above operation, although the cycle time of communication executed once is increased, the states of the respective safety devices can be found, thereby failed portions and the like can be simply specified. Thus, according to the present invention, it is possible to separately use high speed responsiveness and the detailed particulars of information depending on a state.

Specifically, when it is assumed that the safety slave 2 is of an eight-channel input type, the data unit of the transmission frame requires an amount of information of 2 bytes in an ordinary method because safety information of eight channels is transmitted in an ordinary method. In this embodiment, however, the data unit of the transmission frame requires only two bits used for the result of determination of safety regardless of the number of channels.

Figure 5:
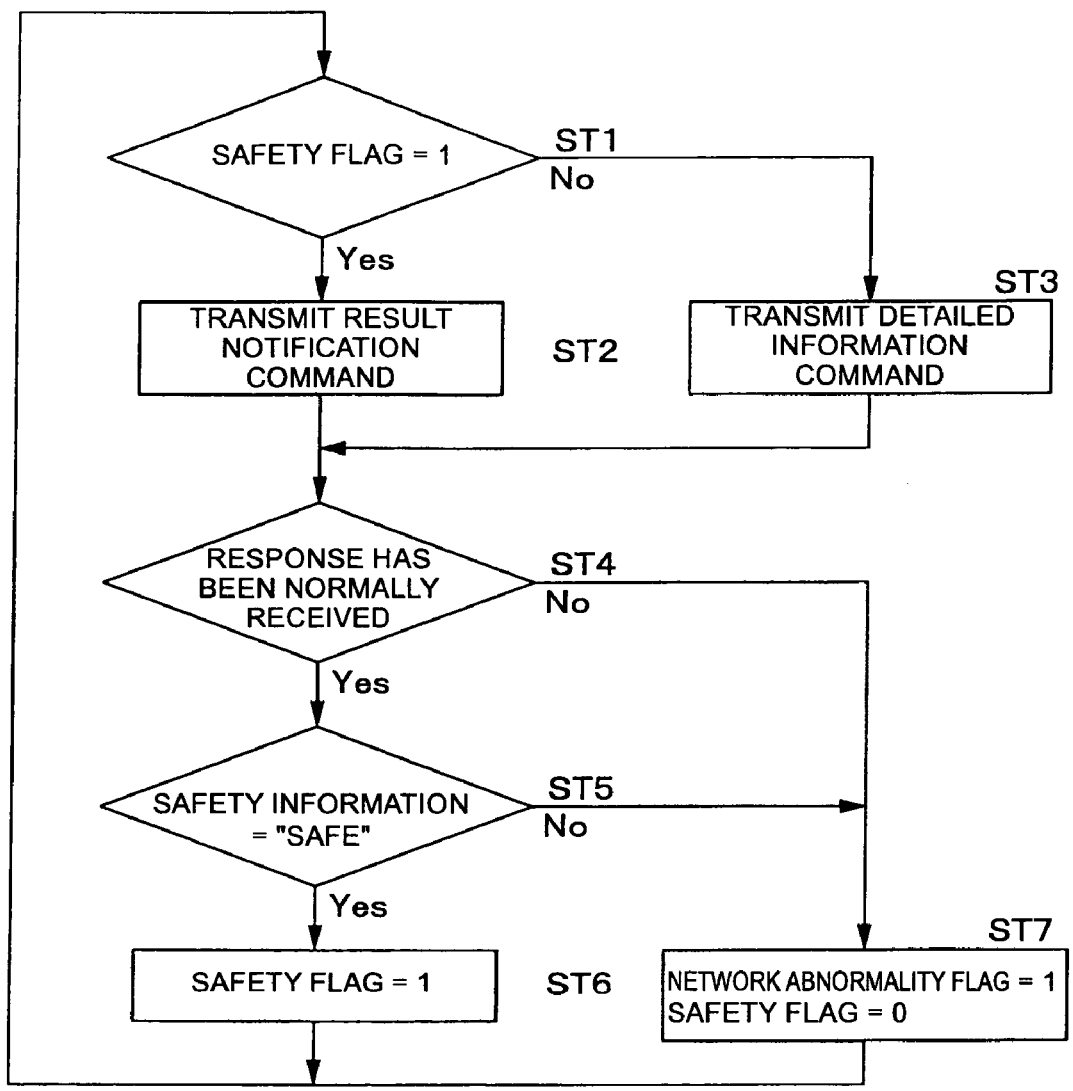
FIG. 5 shows a flowchart of the function of an MPU on a safety PLC side.

The processing function of the MPU on the safety PLC 1 side is arranged as shown in the flowchart of FIG. 5 to realize the processings described above. As a premise, there is provided a safety flag showing a present state. When the safety flag=0, it means that the safety network system is in the dangerous state (at least one of the safety devices is in the dangerous state), and the safety PLC (master) 1 forcibly turns OFF a safety output. Further, when the safety flag=1, it means that the safety network system is in the safe state (all the safety devices are in the safe state), thereby the safety PLC (master) 1 can refresh I/Os. Then, the safety flag is updated by the MPU of the safety PLC 1.

The MPU operates as described below on the basis of the above premise. That is, first, the MPU determines whether or not the safety flag is set to "1" (ST1). When the flag is set to "1", since the system is in the safe state and operates normally, the MPU transmits the result notification request command to prepare the occurrence of an abnormal state (dangerous state) (ST2).

Thereafter, the MPU waits to receive a safety response from the safety slaves 2 (ST4), and when the MPU normally receives the response, it determines whether or not the contents of the received safety information are safe (ST5) When the contents are safe, the MPU sets the safety flag to 1 (ST6). Whereas, when the MPU cannot normally receive the safety response (No at step ST4), and when the contents of the received safety information show the dangerous state, the MPU sets the safety flag to "0" (ST7).

Note that "a case that the MPU cannot normally receive the safety response" and the determination at step S4 is branched to No includes (1) a communication error such as noise and the like, (2) a communication error on a transmission side or a reception side (which can be recovered), (3) removal or interruption of a communication line, (4) a malfunction of the transmitting function of a slave, (5) a malfunction of the receiving function of the master (safety PLC), and the like. In the cases of the items (1) and (2) described above, the safety response can be normally received in a subsequent communication cycle and a communication can be continued. In the cases of the items (3), (4), and (5), however, since the communication itself becomes impossible, the safety PLC cannot receive the safety response in any one of the modes.

Further, when the determination at step 1 is branched to No, since the abnormal state (dangerous state) occurred in the past communication cycles and the safety flag has been updated to "0" at step S7, a detailed information command is transmitted (ST3), and the safety information of each safety device is collected.

Figure 6:
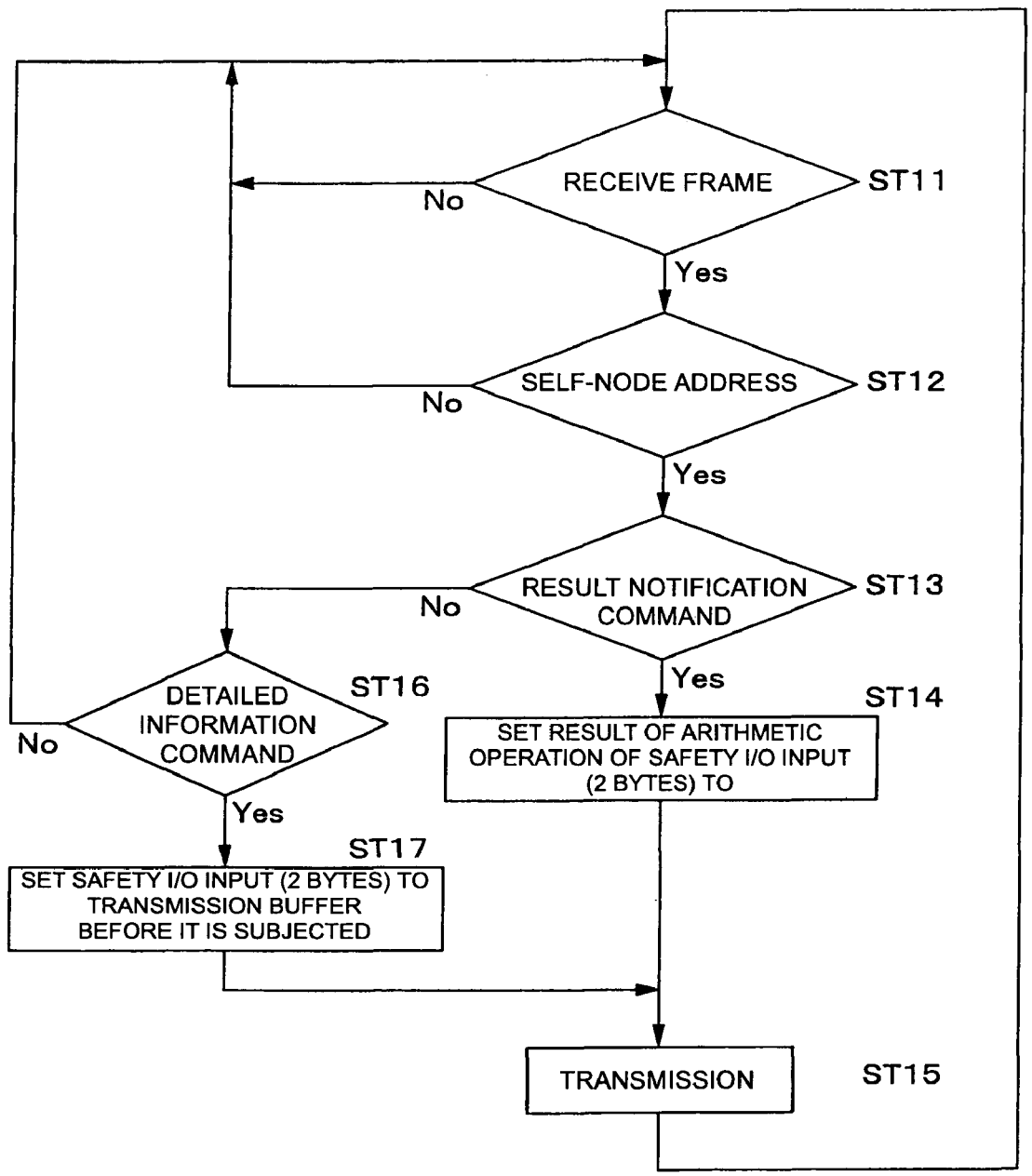
FIG. 6 shows a flowchart of the function of an MPU on a safety slave side.

In contrast, as the function of the MPU 23 on the safety slaves 2 side, first, the MPU 23 waits for a receiving frame as shown in the flowchart of FIG. 6 (ST11). Then, the MPU 23 confirms the address to which the received frame is transmitted and determines whether or not the address is the address of a self-node (ST12). When the address is the address of other node, the MPU 23 returns to step 1 and waits for a next receiving frame.

When the address is the address of the self-node, the MPU 23 determines whether or not the result notification command is requested (ST13), and when the result notification command is requested, the MPU 23 sets a result of determination of safety, that is, a result of an arithmetic operation which determines whether or not all the safety devices connected thereto are safe to a transmission buffer and returns it the safety response (ST14 and ST15).

In contrast, when the received request command is not the result notification command (No at step 13), the MPU 23 determines whether or not the request command is the detailed information command (ST16). When the received request command is the detailed information command, the MPU 23 sets the safety I/O inputs from all the safety devices connected thereto to the transmission buffer before the arithmetic operation is executed and returns it as the safety response (ST17, ST15). Note that when the received request command is not the detailed information command, since it does not request the safety response, the MPU 23 does not transmit the safety response based on the reception of this time, returns to step 11, and waits for a next frame. Thereafter, the MPU 23 repeats the above processings and returns various types of safety responses according to the request.

FIG. 7 shows the main portion of a second embodiment of the present invention. That is, although this embodiment is arranged based on the first embodiment, the information notified in the detailed information mode is different from that of the first embodiment. That is, when information in the detailed information mode is requested from the safety PLC, a safety response having a frame arrangement as shown in FIG. 7(*b*) is returned. Specifically, it is determined whether or not the safety slave itself satisfies the safety condition based on the safety input informations from the plurality of channels in the range of the safety input informations similarly to the transmission frame in the result notification mode (FIG. 7(*a*)), and a cause of danger is notified in addition to a code indicating safety/danger (safety determination result code) determined by the above determination.

The cause of danger includes such cases that "a result of self-diagnosis of the safety slave itself is NG", "a result of diagnosis of a safety device connected to the safety slave is NG", "the outputs from the safety devices (emergency stop push button and the like) is in a state of intending to cause a dangerous state", and the like. In particular, when the cause relates to the safety device connected to the safety slave, channel information for specifying the safety device is included.

It should be noted that although the result of determination of safety and a cause-of-danger code are transmitted in the embodiment, the embodiment is not limited thereto and may transmit the cause-of-danger in addition to, for example, the safety information transmitted in the detailed information in the fist embodiment. Further, the detailed information mode in the first embodiment may be arranged as a detailed information mode 1, the detailed information mode in the second embodiment may be arranged as a detailed information mode 2, a flag may be provided to discriminate three types of the modes, that is, these two detailed information modes and the result notification mode used in an ordinary time, and responding to the request from the safety PLC, a safety response may be returned in a mode alternatively selected from these three types of the modes.

Note that since the arrangement and the operation/working effect of the second embodiment are the same as those of the first embodiment except that the information transmitted in the detailed modes is different from that of the first embodiment, the detailed description of the second embodiment is omitted.

Figure 8:
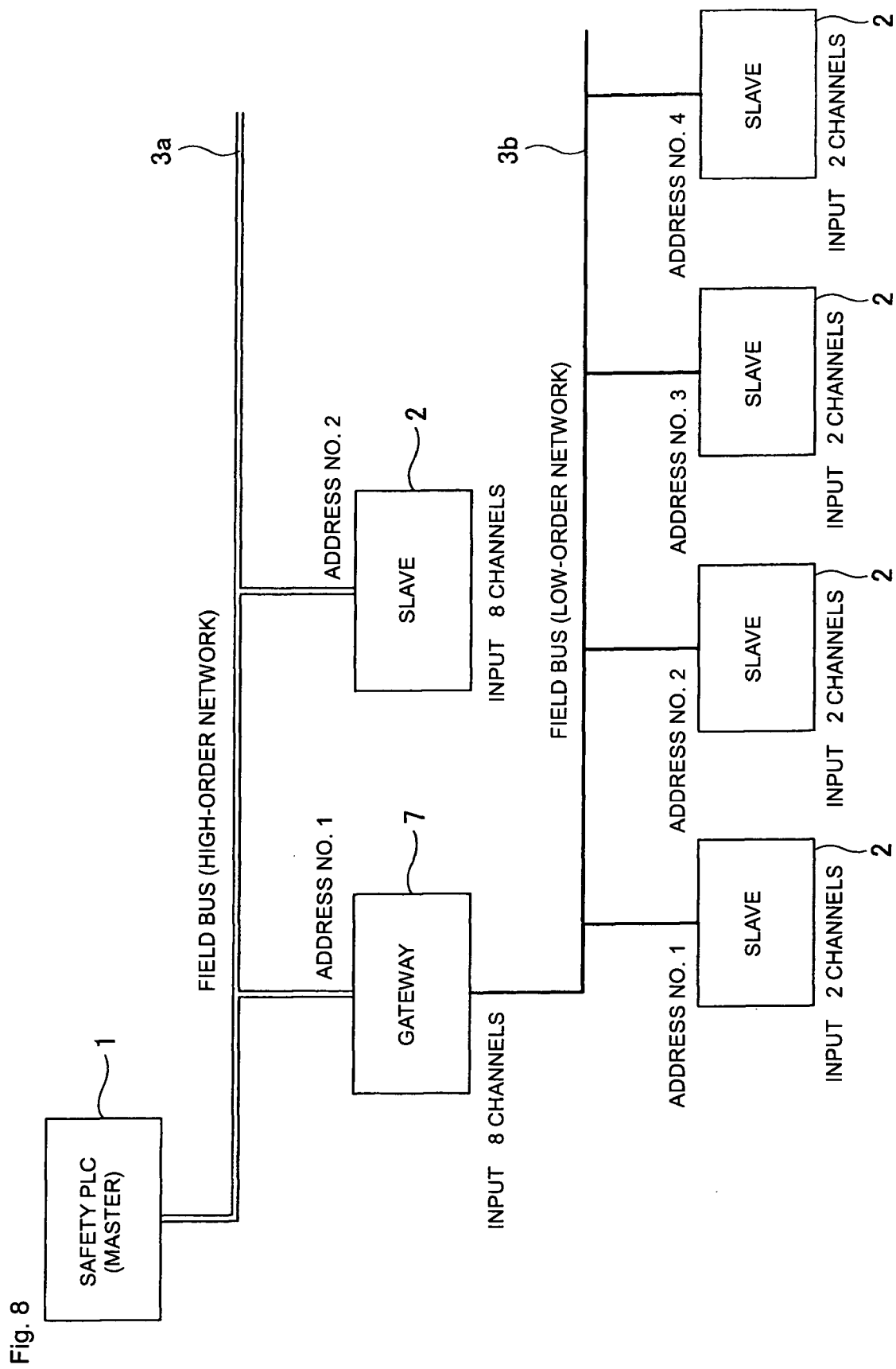
FIG. 8 shows a block diagram of a third embodiment of the safety network system according to the present invention.

FIG. 8 shows a third embodiment of the present invention. This embodiment shows an example that is applied to a multi-stage network system different from the above embodiments. The multi-stage network system has a different type of a field bus connected to the system, and the different type of the field bus is arranged such that a safety gateway 7 is connected to a high-order network 3*a* and a plurality of safety slaves 2 are connected to the safety gateway 7 through a low-order network 3*b*.

In this embodiment, the safety gateway 7 exhibits the same function as that of the safety slave 2 described above, the safety informations from the respective safety slaves 2 connected to the low-order network 3*b* are notified to an high-order master (safety PLC 1) selectively using a plurality of modes. That is, whether or not the safety gateway 7 satisfies a safety condition by itself is determined in the low-order network (field bus) 3*b* based on the safety input informations from the plurality of safety slaves 2 connected to the low-order network 3*b*, and, as a result, a safety determination result code showing safety/danger is sent to the safety PLC 1 through the high-order network 3*a* (high-order field bus) (refer to FIG. 9(*a*)).

This is executed in a result notification mode, and when the safety input informations from all the safety slaves 2 connected to the low-order network 3*b* indicate "safe", a result of determination of safety is "safe", and when the safety information from at least one of the safety slaves indicates "dangerous", the result of determination of safety is "dangerous".

Figure 9:
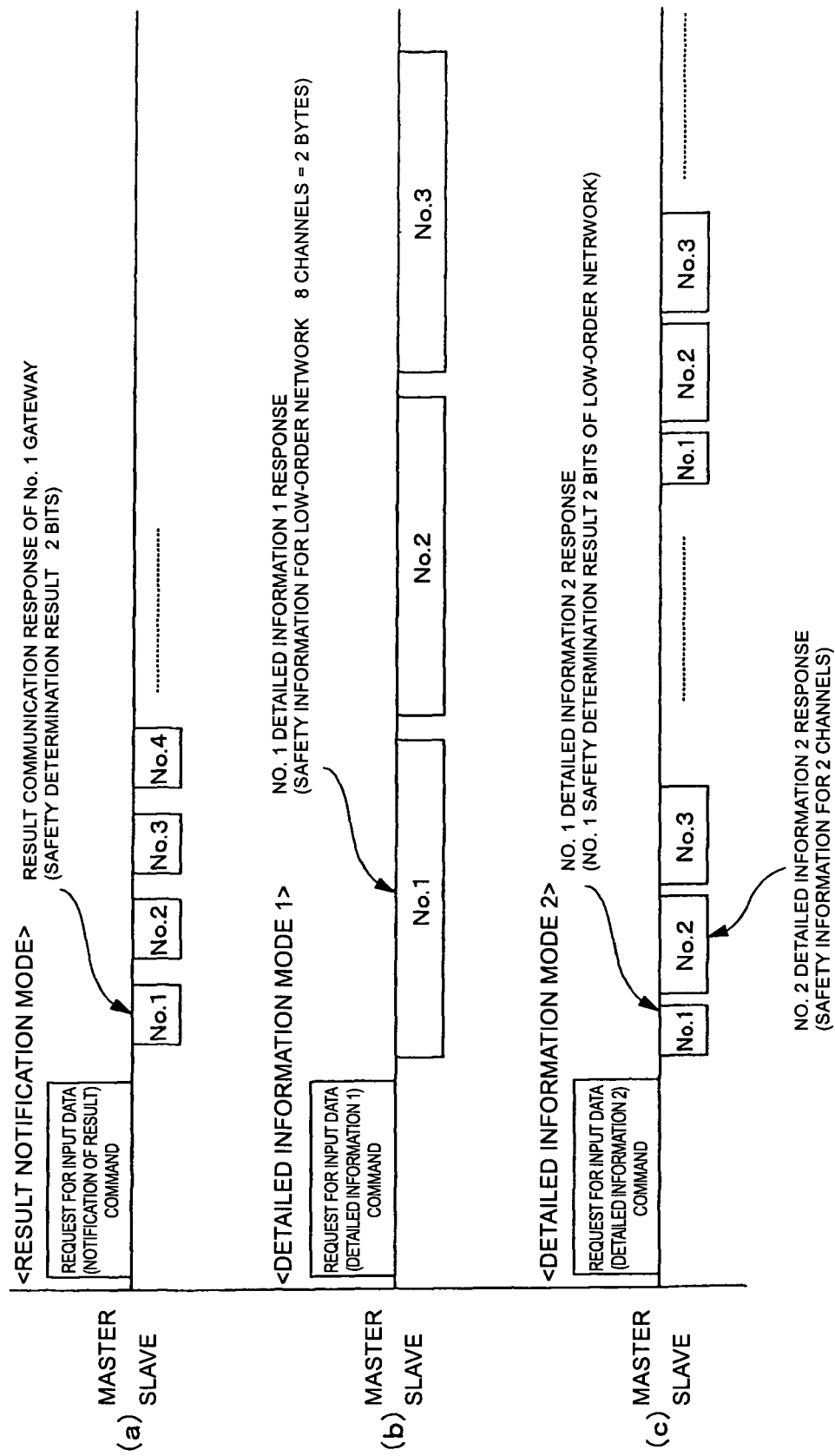

Further, this embodiment also includes a detailed information mode for notifying the safety input informations from the plurality of safety slaves 2 connected to the low-order network 3*b* as they are as aggregated data (refer to FIG. 9(*b*)).

The safety gateway 7 can receive the safety informations from the respective safety slaves 2 connected to the low-order network 3*b* as serial data and can transmit the information (notification of result, detailed information) based on the safety informations to the nodes connected to high-order network 3*a*. An opponent of transmission in this case may be the safety PLC 1, the slaves 2, and the various nodes such as a configuration tool, a monitor device and the like (illustration of which is omitted) connected to the high-order network 3*a*.

Incidentally, the respective safety slaves 2 connected to the high- and low-order networks 3*a* and 3*b* can make transmission in a plurality of modes such as the result notification mode and the detailed information mode likewise. Thus, it is assumed that the respective safety slaves 2 of the high-order network 3*a* transmit a safety response to the safety gateway 7 in the result notification mode. At this time, when the safety gateway 7 makes a response in the result notification mode, if the safety responses from all the four safety slaves 2 indicate "safe", the result of determination of safety is made "safe", and if anyone of the safety responses indicates "dangerous", the result of determination of safety is made "dangerous". Further, when the response is transmitted in the detailed information mode, it is transmitted as a result of determination obtained by aggregating the determinations of safety from the respective safety slaves 2.

Further, as another detailed information mode, it is also possible to notify the safety input informations of the plurality of safety slaves 2 connected to the low-order network 3*b* by time-sharing them in a certain unit (for example, a unit of node) as shown in FIG. 9(*c*). In this case, as shown in the figure, a mode in which the safety response is transmitted can be changed in the respective nodes (safety slaves 2). That is, it is possible to transmit the result of determination of safety from a safety slave (safety slave No. 1 in the illustrated example) and to transmit safety informations (safety input informations from all the safety devices) from other safety slaves (safety device No. 2 and the like in the illustrated example).

Any one of the two types of the detailed information modes may be previously built in so that information is transmitted only in the built-in mode, or it is also possible to transmit the information in any one of the detailed information modes selected in response to a flag requested from the safety PLC 1.

Note that the I/O refresh function of the MPU of the safety gateway 7 may have a basic arrangement similar to that shown in FIG. 6 except that the data set to a transmission buffer at steps 14 and 16 is the data based on the safety inputs from the low-order network 3*b*. Note that since the arrangement and the operation/working effect of the embodiment other than those described are the same as those of the embodiments described above, the detailed described thereof is omitted.

Further, a system using the gateway may also use the result of determination of safety, to which a danger-cause code is added, in the detailed information mode. The cause of danger includes, for example, such cases that "a result of self-diagnosis of the safety gateway 7 is NG", "the low-order network 3*b* is abnormal", "removal of the safety slaves 2 connected to the low-order network 3*b* from the network", "a result of self-diagnosis of the safety slaves 2 connected to the low-order network 3*b* is NG", "the outputs from the safety devices (emergency stop push button and the like) linked to the safety slaves 2 connected to the low-order network 3*b* is in a state of intending to cause danger", and the like. In particular, when the cause of danger relates to the safety slaves 2 connected to the low-order network 3*b* and the safety devices connected to the safety slaves 2, the cause of danger also includes the address information and the channel information for specifying the devices.

Although a communication command, which is built in the request from the safety PLC 1, is used as a means for determining an operation mode in the respective embodiments described above, the present invention is not limited thereto, and a set switch, which is mounted on the safety slaves 2 and the safety gateway 7, may be used as the means.

Further, the above embodiments have explained an example of the master/slave system in which the slaves transmit and receive I/O information to and from the master unit, the system is controlled by transmitting and receiving the I/O information to and from the controller (PLC) through the master unit, and a desired slave returns a response between the master unit and the slaves in response to the request from the master. However, the slaves referred to in the present invention are not limited to the slaves that make communication between the master and the slaves. That is, the slaves can use any arbitrary communication system although they are called slaves. Strictly speaking, it can be said that the slaves include a concept different from that of ordinarily defined slaves in this point. More specifically, the slaves referred to in the present invention can use any arbitrary communication protocol when they actually transmit and receive information as long as they have a function for transmitting and receiving I/O information necessary to control to and from the controller. In particular, an opponent as a subject of transmission in the present invention, to which safety information is transmitted, is not limited to the master unit and the controller and may be devices such as other slaves and the like other than the self-node, that is, may be other nodes.

The communication system can be appropriately selected according to a communication opponent. It is needless to say that a trigger for executing communication is not limited to the one which executes it in response to an external request such as the request from the master, and the communication may be executed based on an internal trigger (an internal timer, an event and the like which occur when they agree with a predetermined condition).

The "internal trigger" is based on a result of a predetermined processing executed by a slave itself and created in the slave. Examples of the internal trigger are as shown below. That is, when an abnormal state occurs and when the state information of an input/output device obtained by a slave reaches a threshold value or when it is determined whether or not the state information exceeds the threshold value, a result of determination occurs. In this case, the result of determination is used as a trigger signal. Further, a clock is built in a slave, and a trigger signal is periodically created each time a predetermined time passes or at a predetermined time.

Further, when a safety slave transmits information based on the internal timer built therein at a time other safety slave already transmit information, the slave interrupts the transmission of the information, or when both the slaves collide with each other on the network because they transmit information simultaneously, the safety slave having a higher priority (having a smaller node number) continues the transmission of the information as it is. With this operation, the respective safety slaves can sequentially transmit the information in a predetermined sequence in a communication cycle executed once. Thereafter, the information can be smoothly transmitted repeatedly by appropriately setting a transmission timer.

In contrast, "the external trigger" is based on a command received by a slave through the network and created externally of the slave. As examples of the external trigger, the external trigger includes an information request command from the master to a slave, an information request command from a monitor device to a slave, an information request command from a configurator, a command transmitted from a tool and sent through the PCL and the master, and the like.

Figure 10:
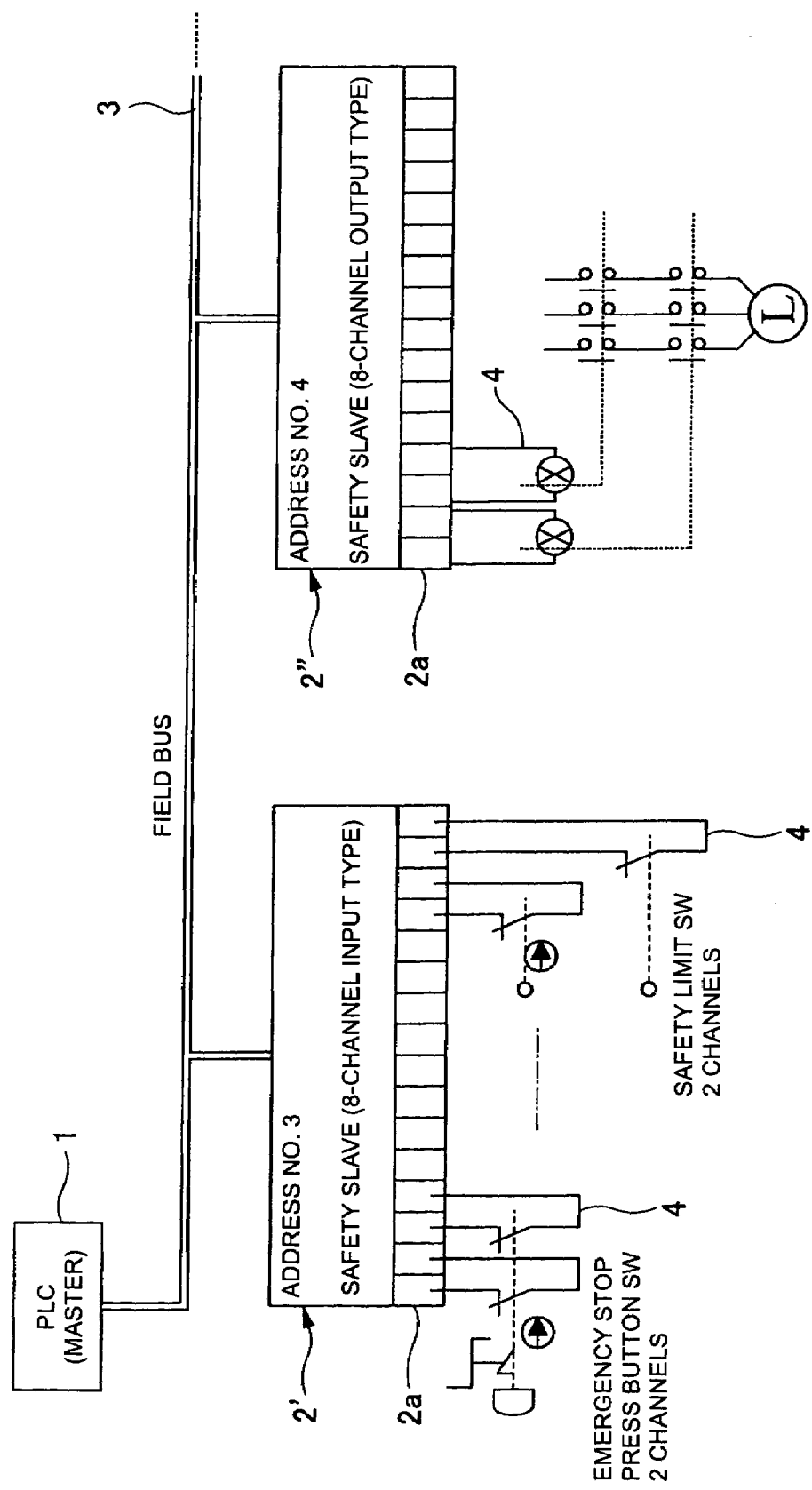
FIG. 10 shows a view of a fourth embodiment of the safety network system according to the present invention.
Figure 11:
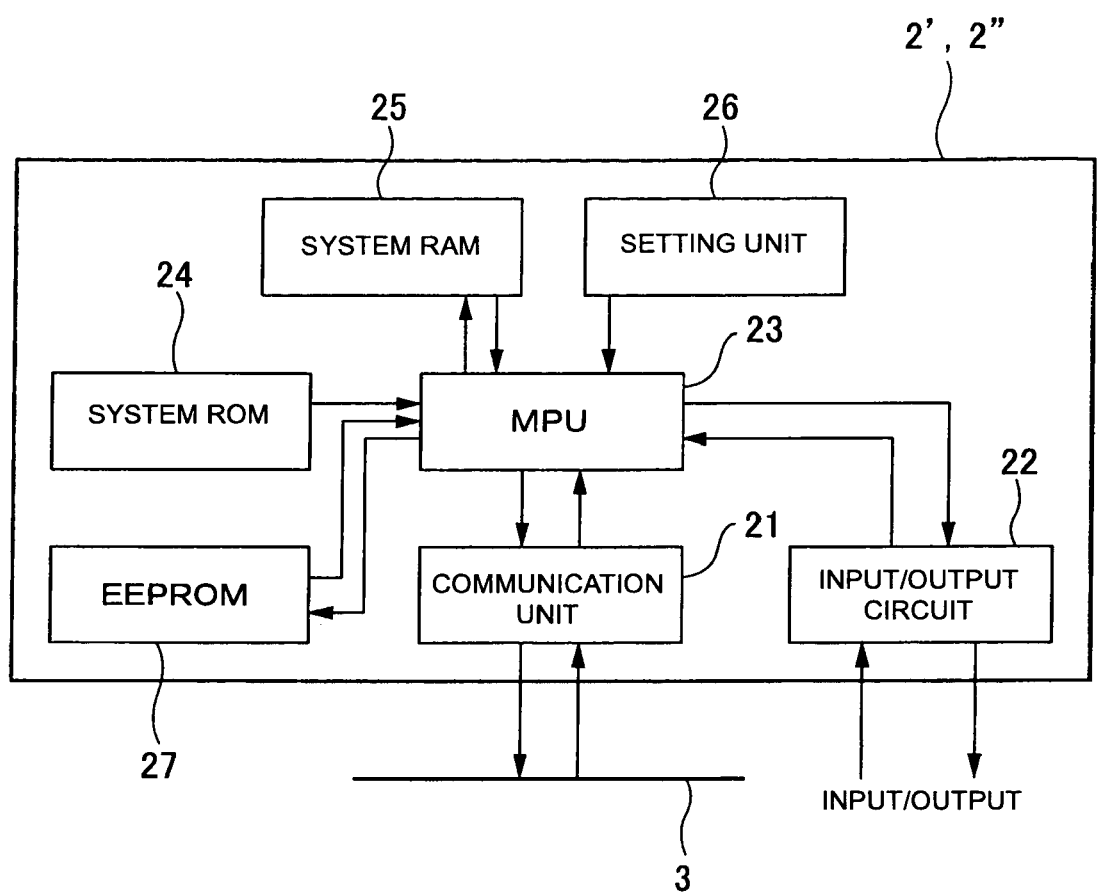
FIG. 11 shows a view of a safety slave in the fourth embodiment according to the present invention.

A specific example in which a communication is executed to a node other than the master is shown in, for example, a fourth embodiment illustrated in FIG. 10 and the subsequent figures. The fourth embodiment shows an example of a system in which communication opponents are slaves, that is, a system in which safety information is transmitted from an IN slave to an OUT slave.

As shown in FIG. 10, a plurality of safety slaves are connected to a safety network (field bus) 3 to which a safety PLC 1 (master) is connected. In this embodiment, an IN slave 2' and an OUT slave 2" are used as the safety slaves. Input devices such as a safety limit switch, an emergency stop switch, and the like are connected to the terminal table 2a of the IN slave 2' as safety devices 4 connected thereto. The safety input informations from safety devices 4 are sent to the master 1 through the safety network 3. Further, input devices such as a relay, a motor, an actuator, and the like are connected to the terminal table 2a of the OUT slave 2" as safety devices 4 connected thereto. The OUT slave 2" controls the operation of the output devices based on the output information (I/O information) sent from the master 1.

In this embodiment, the safety information detected by the IN slave 2' is sent to the OUT slave 2" through the safety network 3 at predetermined timing. In contrast, the internal structure of the safety slave 2 is arranged as shown in FIG. 2. As shown in the figure, the safety slave 2 includes a communication unit 21, which is connected to the safety network 3 and transmits and receives data to and from the safety PLC 1 (master), an input/output circuit 22 for transmitting and receiving data to and from the safety devices 4 connected to the safety slaves 2, and an MPU 23 for reading out a program stored in a system ROM 24 and executing predetermined processing. The MPU 23 executes processing for returning informations (safety information and the like) which are obtained from the safety devices 4 through an input/output circuit 22, to the safety PLC 1 (master) through a communication unit 21 and the safety network 3 in response to a request addressed thereto and received thereby through the communication unit 21. These basic arrangements are the same as those of the respective embodiments described above.

In this embodiment, since the safety slaves directly communicate with each other, the addresses of communication opponents and a communication condition must be stored. Thus, each of the IN and OUT slaves 2' and 2" includes a setting unit 26 for setting the addresses of a self-node and a transmission opponent and a storing unit 27 for storing the address information and the like set by the setting unit 26. The setting unit 26 can be composed of, for example, a dip switch. Further, the storing unit 27 can be composed of an EEPROM.

The storing unit 27 also stores a transmission trigger condition for determining timing at which safety information is transmitted together with the address information. The transmission trigger condition can be set from, for example, a not shown configuration tool connected to the field bus 3. Further, the configuration tool may be directly connected to the slaves without passing through the network. Furthermore, the address information stored in the storing unit 27 may be set from the configuration tool in place of the setting unit 26.

Figure 12:
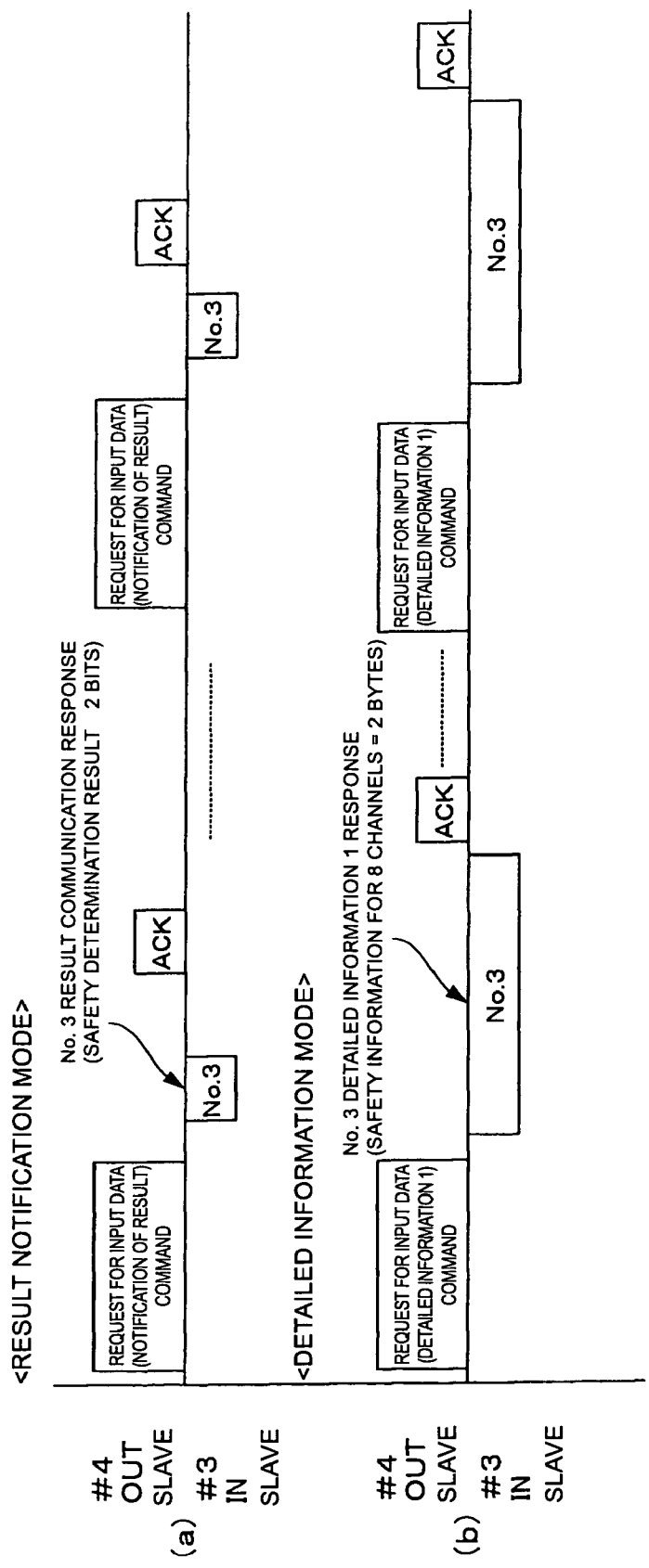

When the transmission trigger condition is an external trigger, that is, a request command from the OUT slave 2", the safety information is transmitted at timing shown in, for example, FIG. 12.

More specifically, an input data request command is sent from the OUT slave 2" to the IN slave 2'. At this time, a type of a mode, that is, whether or not the mode is a result notification mode or a detailed information notification mode is also sent together with the input data request command. The IN slave 2', which has received the command, returns a response in a designated mode. That is, when the IN slave 2' receives an input data (result notification) command, it returns a result notification response that shows a result of the safety information by two bits. Further, when the IN slave 2' receives an input data (detailed information 1) command, it returns a detailed information 1 response for eight channels (2 bytes) as the safety information. The OUT slave 2", which has received the respective responses, returns an acknowledgement (ACK) to the IN slave 2'. Note that other device uses the network during the period of time from the return of the ACK from the OUT slave 2" to the issue of a next input data request command.

Figure 13:
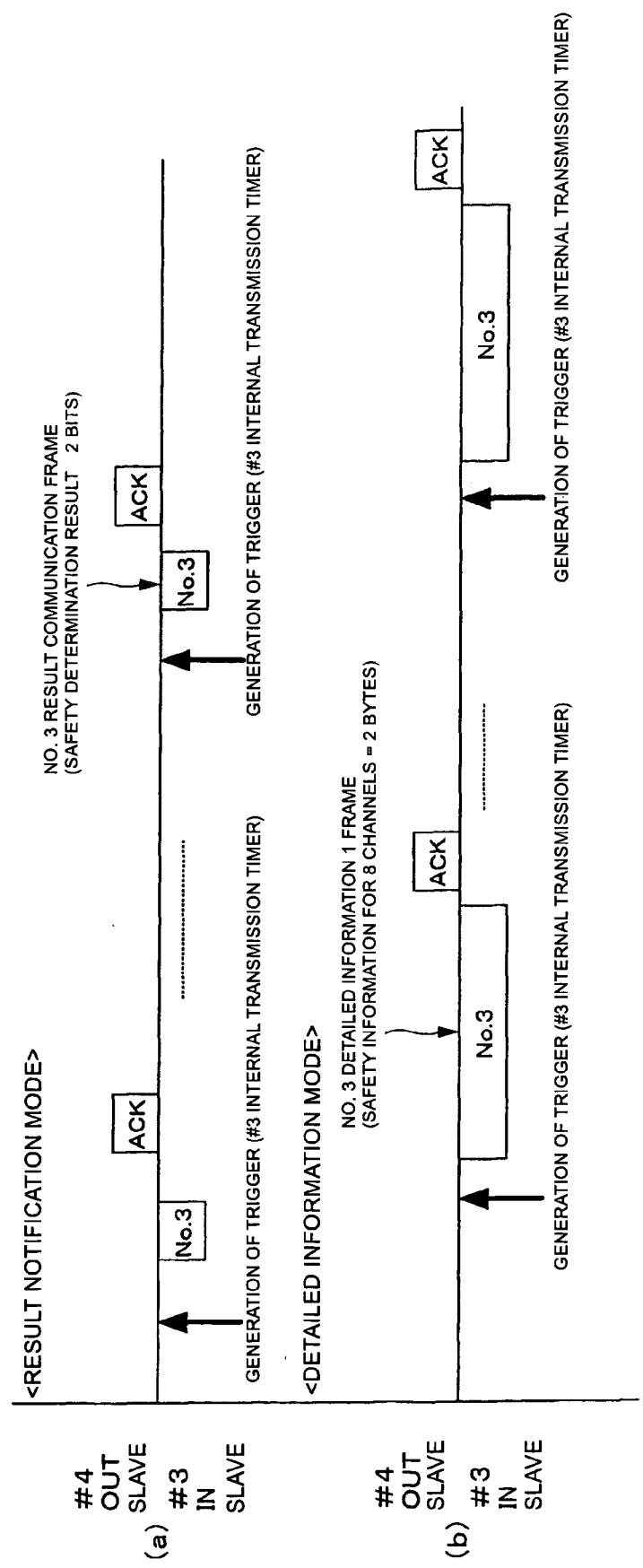
FIGS. 13(a) and 13(b) show views of examples of timing of transmission of the frame between the IN slave and the OUT slave.

When the transmission trigger condition is an internal command of the IN slave 2', the safety information is transmitted at timing shown in, for example, FIG. 13. That is, when the IN slave 2' generates a trigger based on that an internal transmission timer detects, for example, that a predetermined time has passed, the IN slave 2' transmits a result notification frame (2 bits) or a detailed information 1 frame (8 channels=2 bytes) to the OUT slave whose address is previously registered. The OUT slave 2", which has received the respective frames, returns an ACK to the IN slave 2'. Note that, also in this example, other device uses the network during the period of time from the return of the ACK from the OUT slave 2" to the issue of a next safety information notification frame.

Further, in this example, the IN slave 2' switches the result notification mode and the detailed information mode. That is, a condition under which a certain mode is used in transmission is also registered previously, and which of the modes is to be used is determined from a present state according to the condition, and a notification frame is created in correspondence to the determined mode and transmitted. The condition is set, for example, such that the result notification mode is ordinarily employed, and when the result notification frame is transmitted a predetermined number of times, transmission can be executed in the detailed information mode. Further, it is also possible to determine a mode based on information abstracted at the time.

Figure 14:
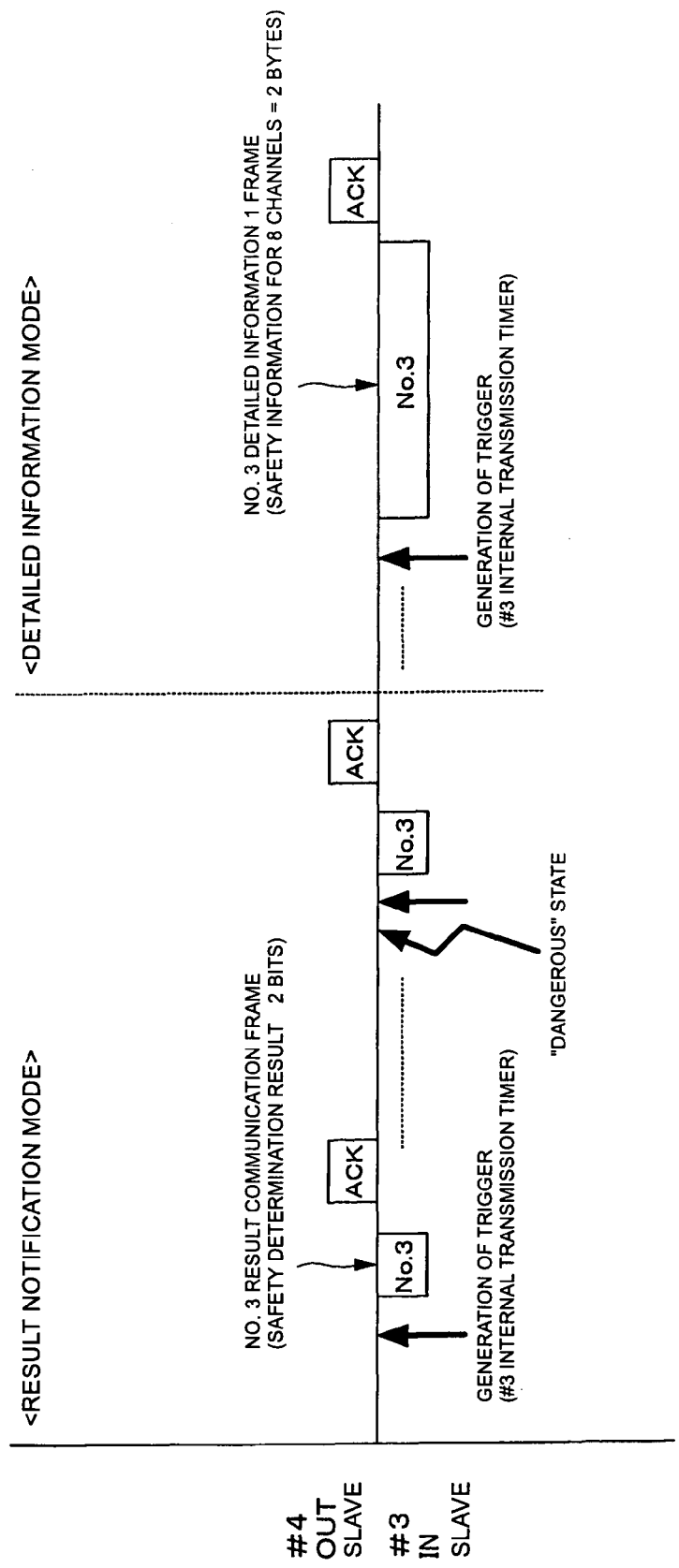
FIG. 14 shows a view of another example of timing of transmission of the frame between the IN slave and the OUT slave.
Figure 15:
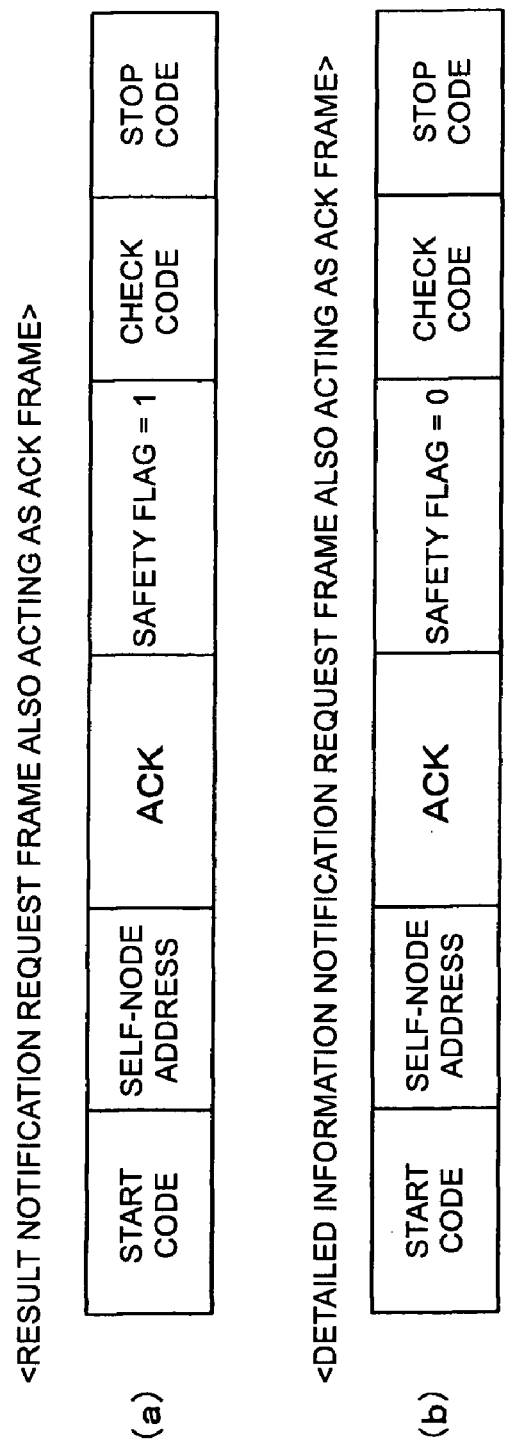
FIGS. 15(a) and 15(b) show views of examples of a data structure of an ACK frame output from the OUT slave when the IN slave applies an internal trigger.

Further, the mode may be also switched according to a command from the OUT slave. That is, as shown in FIG. 14, the IN slave 2' ordinarily creates a result notification frame in response to the occurrence of a trigger and transmits the result notification frame. The OUT slave 2" returns an ACK frame in response the result notification frame received thereby. However, when a mode indication flag is included in the ACK frame and indicates switching to the detailed mode, the detailed information frame will be transmitted thereafter. The ACK frame including the mode indication flag may employ a structure as shown in FIG. 15. In this example, a "safety flag" is prepared as the mode indication flag, and when the safety flag is set to 1, it means a result notification request (refer to FIG. 15(*a*)), whereas when the safety flag is set to 0, it means a detailed information notification request (refer to FIG. 15(*b*)).

Figure 16:
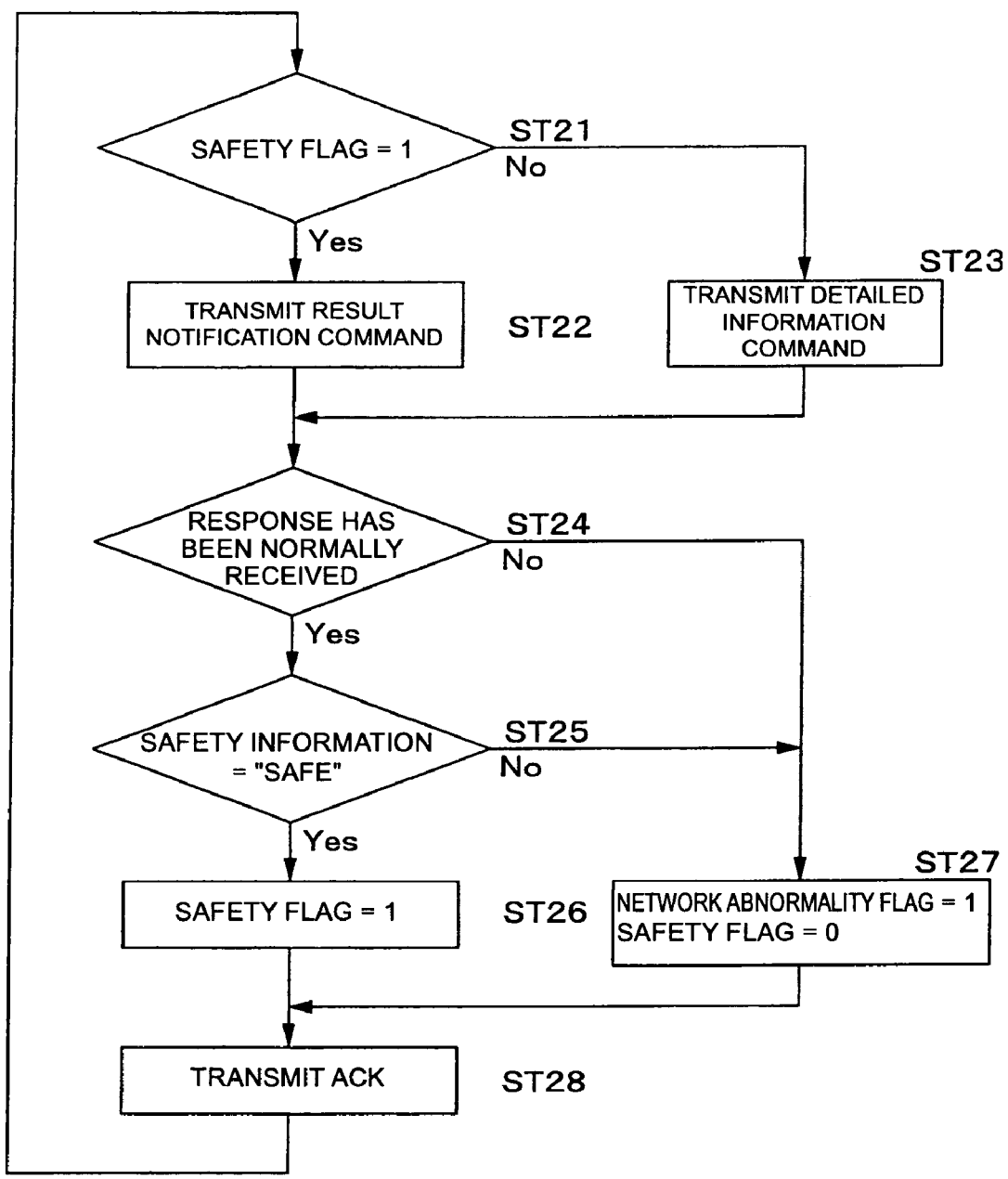
FIG. 16 shows a flowchart explaining the function of the OUT slave when the OUT slave applies a trigger.

Next, the specific processing function of the MPU of each slave for executing the respective procedures described above will be explained. First, when the safety information is transmitted based on the external trigger shown in FIG. 12, the function of the MPU of the OUT slave 2" is as shown in the flowchart of FIG. 16. That is, although the function of the MPU is basically similar to that of the master 1 in the first embodiment, an ACK transmission processing step is added to the function.

That is, as a premise, there is provided a safety flag showing a present state. When the safety flag=0, it means that a safety network system is in a dangerous state (at least one of the safety devices is in the dangerous state), and the safety PLC (master) 1 forcibly turns OFF a safety output.

Further, when the safety flag=1, it means that the safety network system is in a safe state (all the safety devices are in the safe state), thereby the safety PLC (master) 1 can refresh I/O. Then, the safety flag is updated by the MPU of the safety PLC 1.

The MPU operates as described below on the basis of the above premise. That is, first, the MPU determines whether or not the flag is set to "1" (ST21). When the flag is set to "1", since the system is in the safe state and operates normally, the MPU transmits the result notification request command to the IN slave 2' to prepare the occurrence of an abnormal state (dangerous state) (ST22).

Thereafter, the MPU waits to receive a safety response from the IN slave 2' (ST24), and when the MPU normally receives the response, it determines whether or not the received safety information is safe (ST25). When the safety information is safe, the MPU sets the safety flag to 1 (ST26). Whereas, when the MPU cannot normally receive the safety response (No at step ST24), and when the contents of the received safety information show are the dangerous state, the MPU sets a network abnormal flag to 1 as well as sets the safety flag to "0" (ST27).

Note that "a case that the MPU cannot normally receive the safety response" and the determination at step ST24 is branched to No includes (1) a communication error such as noise and the like, (2) a communication error on a transmission side, or a reception side (which can be recovered), (3) removal or interruption of a communication line, (4) a malfunction of the transmitting function of a slave, (5) a malfunction of the receiving function of the master (safety PLC), and the like. In the cases of the items (1) and (2) described above, the safety response can be normally received in a subsequent communication cycle and a communication can be continued. In the cases of the items (3), (4), and (5), however, since the communication itself becomes impossible, the safety PLC cannot receive the safety response of any one of the modes.

Further, when the determination at step 1 is branched to No, since the abnormal state (dangerous state) occurred in the past communication cycles and the safety flag has been updated to "0" through step S7, the detailed information command is transmitted to the IN slave 2' (ST23), and the safety information of each safety device is collected. After the safety flag is registered at step 26 or 27, the MPU returns an ACK to the IN slave 2'. Then, the MPU repeats the above processings.

Figure 17:
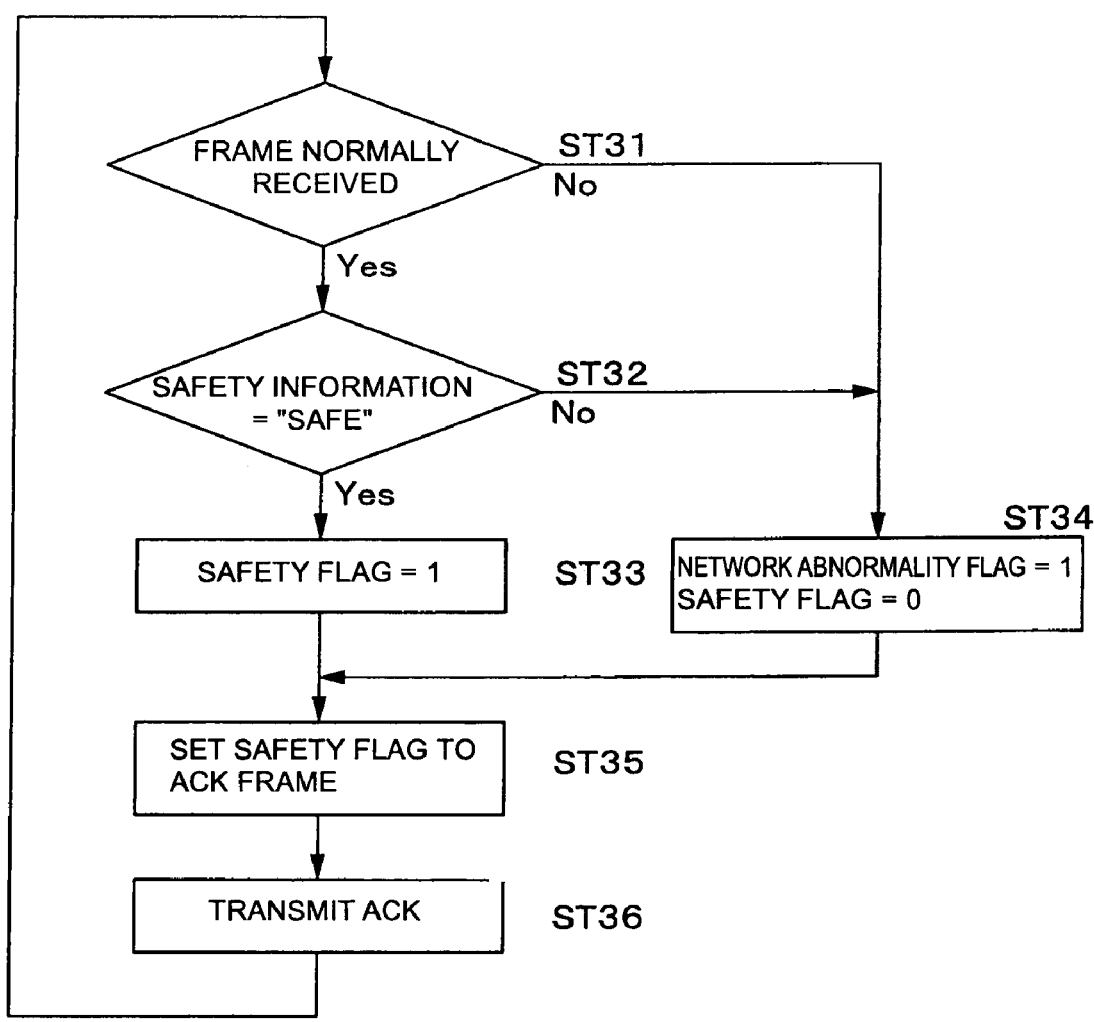
FIG. 17 shows a flowchart explaining the function of the OUT slave when the IN slave applies a trigger.

When the IN slave 2' as shown in FIG. 14 transmits the safety information based on the internal trigger and the OUT slave switches the mode, the processing function of the MPU of the OUT slave 2" is as shown in the flowchart of FIG. 17. That is, first, the MPU determines whether or not it normally receives the notification frame of the safety information from the IN slave (ST31). When the MPU normally receives the notification frame, it determines whether or not the contents of the safety information sent thereto are "safe" (ST32). When the contents of the safety information are safe, the MPU sets the safety flag to 1, whereas when they are not safe, the MPU sets the network abnormal flag to 1 as well as sets the safety flag to 0 (ST34). Note that when the notification frame cannot be normally received (determination at step 31 is branched to No), the processing at step 34 is also executed.

After the safety flag is registered at step 33 or 34, the safety flag is set to an ACK frame. With the above operation, anyone of the ACK frames shown in FIG. 15 is created.

Next, the MPU returns an ACK with the safety flag to the IN slave 2' (ST36). Then, the MPU repeats the above processings.

Note that although a specific flowchart is omitted, when the IN slave 2' as shown in FIG. 13 transmits the safety information based on the internal trigger and also switches the mode, the processing function of the MPU of the OUT slave 2" is as shown below. That is, first, the MPU receives the notification frame of the safety information from the IN slave. Next, when the MPU normally receives the notification frame, it transmits an ACK to the IN slave. Then, the MPU repeats the above processings.

Further, when the MPU of the OUT slave 2" receives the safety information, which indicates "not safe (dangerous)" from the IN slave 2', the MPU executes a desired failsafe processing by stopping an output device, and the like. As described above, the safety information can be obtained promptly because it can be directly obtained from the IN slave without passing through the master. Accordingly, a period of time from the occurrence of the abnormal state to the operation of failsafe function can be reduced.

Figure 18:
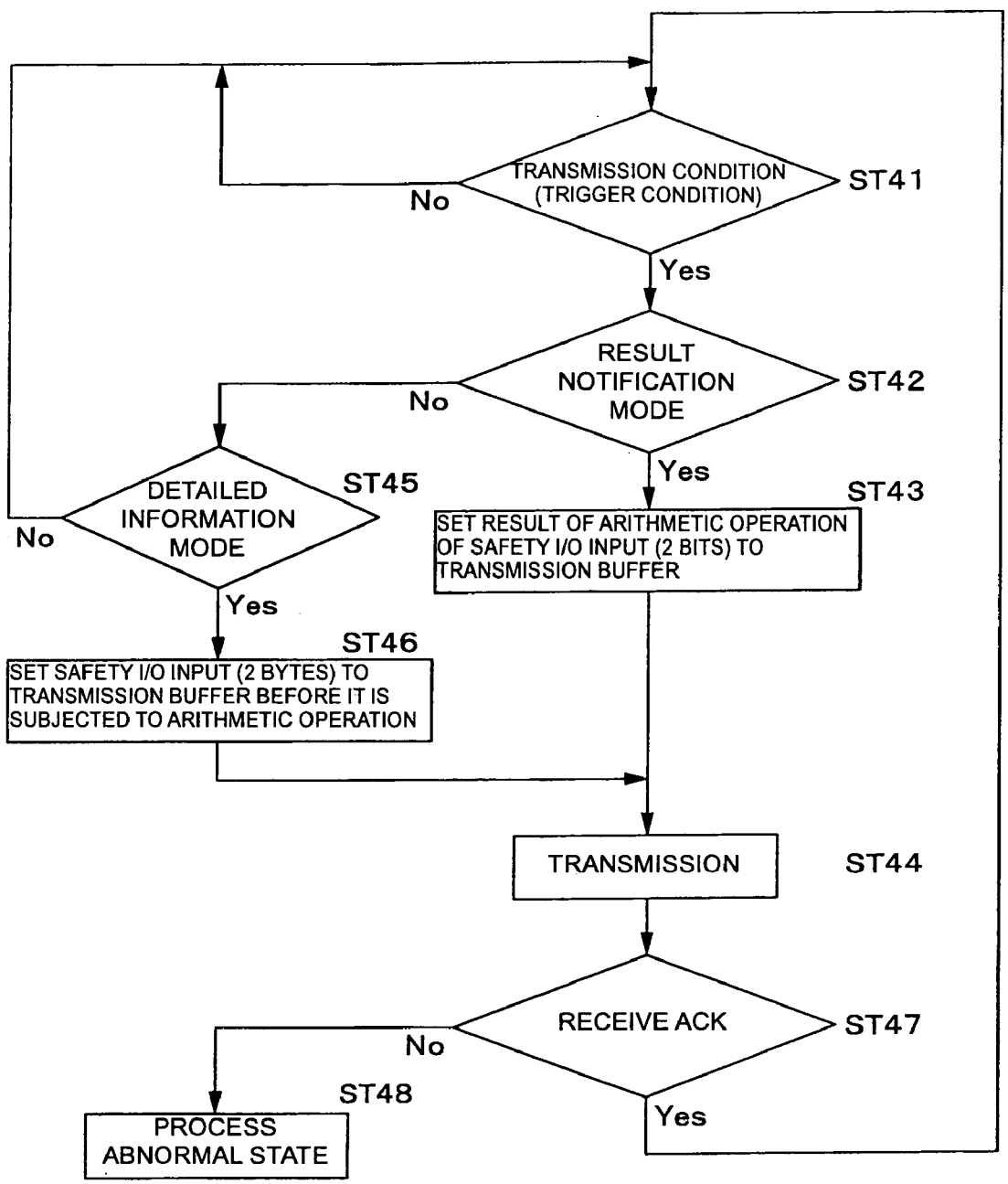
FIG. 18 shows a flowchart explaining the function of the IN slave.

In contrast, the function of the MPU 23 of the IN slave 2' is executed according to the flowchart of FIG. 18. This flowchart can be applied to any type of the timing of transmission shown in FIGS. 12 to 14.

First, the MPU 23 determines whether or not a transmission condition is satisfied (ST41). When the external trigger is employed, it is determined that the transmission condition is satisfied when the MPU 23 receives an input request command from, for example, the OUT slave. Further, when the internal trigger is employed, it is determined that the transmission condition is satisfied when an internal timer measures a predetermined time or when a condition event occurs.

It is waited for the transmission condition to be satisfied and when it is satisfied, the MPU 23 determines whether or not the result notification mode is employed (ST42). This determination can be made depending on whether or not the safety flag is set to 1. When the result notification mode is employed, the result of arithmetic operation of a safety I/O input (2 bits) is set to a transmission buffer (ST43) In contrast, when the detailed information mode is employed, the safety I/O input (2 bytes) is set to the transmission buffer before it is subjected to the arithmetic operation (ST45, ST46). Note that when any of the above modes is not employed, the MPU 23 returns to step 41 and waits that a next transmission condition is satisfied.

After the MPU 23 executes the processing at step 43 or 46 and sets the safety information to the transmission buffer, it transmits the safety information to the OUT slave (ST44). As described above, when the OUT slave 2 receives the safety information, it returns the ACK to the MPU 23. Thus, the MPU 23 determines whether or not it receives the ACK (ST47). When the MPU 23 receives the ACK, it returns to step S41 and waits that a next transmission condition is satisfied. Further, when the MPU 23 does not receive the ACK, the MPU 23 executes a predetermined abnormality processing (ST48).

Note that although this embodiment shows the example that the safety information is transmitted from the IN slave to the OUT slave, the combination of the slaves when the safety information is sent to nodes other than the master node is not limited to the above combination and can be set arbitrarily selected.

Further, the embodiments described above may be executed independently or a plurality of embodiments may be executed in combination. As an example, a certain IN slave may transmit the safety information to the OUT slave in an event mode while executing transmission ordinarily in the master/slave system.

INDUSTRIAL APPLICABILITY

According to the present invention, the safety slave determines whether or not the safety condition is satisfied based on a plurality of the safety input informations and returns the result of determination of safety to the safety controller as the safety response. Accordingly, the safety slave can promptly transmit the information whether or not the safety devices (safety slaves) are safe to the master (safety controller) and other devices. As a result, the failsafe function can be promptly executed when an abnormal (dangerous) state occurs.

What is claimed is:

1. A safety slave configured for connection to a safety network and which transmits information based on a plurality of safety information inputs managed by the safety slave in response to a request from a safety controller sent through the safety network, comprising:
   safety determination means for determining whether or not a safety condition is satisfied based on the plurality of safety information inputs; and
   means for transmitting a result of a determination of safety determined by the safety determination means, as the information.

2. The safety slave according to claim 1, wherein information in the information inputs is composed of aggregated data, and wherein the safety slave is configured to use the plurality of safety information inputs without modification since the information is composed of aggregated data.

3. The safety slave according to claim 1, wherein the safety slave is configured to detect the cause of danger to at least one of the safety slave itself and devices managed by the safety slave as well as transmitting data indicative of the cause of danger detected thereby by adding it to the information.

4. The safety slave according to claim 1, wherein the safety slave is a safety gateway to which a different type of a field bus is connected.

5. The safety slave according to claim 4, wherein:
   the safety information comprises a plurality of safety information inputs from a plurality of other safety slaves connected to the safety gateway; and wherein:
   the safety gateway is configured to transmit the plurality of safety information inputs obtained in each predetermined unit using time-sharing.

6. The safety slave according to claim 1, wherein the safety slave is configured to transmit at least in one of a result notification mode in which the result of determination of safety is transmitted, and a detailed information mode which is different from the result notification mode and in which more detailed information is transmitted, and
   wherein switching of the transmission modes is selectively executed based on a communication command from the safety controller.

7. The safety slave according to claim 1, wherein:
   the safety slave is configured to transmit at least in one of a result notification mode in which the result of determination of safety is transmitted and in a detailed information mode which is different from the result notification mode and in which more detailed information is transmitted; and wherein:

the safety slave comprises a setting switch means for switching the modes in which transmission is executed.

8. A safety network system wherein a safety controller is connected to the safety slave according to claim 1, through a safety network, and wherein the information from the safety slave is transmitted to the safety controller through the safety network.

9. A safety controller connected to a safety network so as to comprises a safety network system having a safety slave according to claim 2, characterized in that:

the safety controller comprises a state storing unit for storing and holding whether or not the state of the safety network system is in a safe state, wherein, when a present state stored in the state storing unit is safe, the safety controller requests the safety slave to transmit the result of the determination of safety; and when the present state stored in the state storing unit is not safe, the safety controller requests the safety slave to transmit detailed information which is more detailed than the result of determination of safety.

10. A safety slave configured to be connected to a safety network and to transmit information based on a plurality of safety information inputs managed by the safety slave to other nodes connected to the safety network, comprising:

a safety determination means for determining whether or not a safety condition is satisfied based on the plurality of safety information inputs: and means for transmitting a result of determination of safety determined by the safety determination means as the information.

11. A safety network system comprising a safety slave connected to a safety network, wherein information from the safety slave is transmitted to at least one other node through the safety network, and wherein the safety slave is configured to be connected to the safety network and to transmit information, based on a plurality of safety information inputs managed by the safety slave, to the at least one other node connected to the safety network, and which comprises:

a safety determination means for determining whether or not a safety condition is satisfied based on the plurality of safety information inputs: and means for transmitting a result of determination of safety determined by the safety determination means as the information.

* * * * *